(12) United States Patent
Yajima

(10) Patent No.: US 7,168,863 B2
(45) Date of Patent: Jan. 30, 2007

(54) OPTICAL ELEMENT, AND OPTICAL MODULE, AND OPTICAL TRANSCEIVER

(75) Inventor: Takeshi Yajima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/333,240

(22) Filed: Jan. 18, 2006

(65) Prior Publication Data
US 2006/0159405 A1 Jul. 20, 2006

(30) Foreign Application Priority Data
Jan. 19, 2005 (JP) ............................. 2004-011677
Nov. 7, 2005 (JP) ............................. 2005-322504

(51) Int. Cl.
G02B 6/36 (2006.01)
H01L 33/00 (2006.01)
H04B 10/12 (2006.01)
H04B 10/00 (2006.01)
H04B 10/06 (2006.01)

(52) U.S. Cl. ............................. 385/92; 385/94; 257/99; 257/100; 398/135; 398/140; 398/182; 398/202

(58) Field of Classification Search ................. 385/92, 385/94; 257/99, 100
See application file for complete search history.

(56) References Cited

U.S. PATENT DOCUMENTS 6,953,291 B2 * 10/2005 Liu .............................. 385/94
2004/0022502 A1 * 2/2004 Zhou ............................ 385/94

FOREIGN PATENT DOCUMENTS

JP   A 2002-534813   10/2002
JP   A 2004-95824    3/2004

* cited by examiner

Primary Examiner—Michelle Connelly-Cushwa
Assistant Examiner—Chris Chu
(74) Attorney, Agent, or Firm—Oliff & Berridge, PLC

(57) ABSTRACT

An optical element includes an optical section having at least one of an emission section and a photodetection section, a sealing member that surrounds at least a part of the optical section through an internal space, an electrode that is electrically connected to the optical section, a conductive member that is contained in the sealing member and conductively connected to the electrode, a substrate that is disposed opposite to an optical surface provided at the optical section, and a wiring that is formed on the substrate and conductively connected to the conductive member, wherein the optical surface is at least one of a plane of light emission and a plane of light incidence.

20 Claims, 19 Drawing Sheets

OPTICAL ELEMENT, AND OPTICAL MODULE, AND OPTICAL TRANSCEIVER

The entire disclosure of Japanese Patent Application No. 2005-011677, filed, Jan. 19, 2005 and No. 2005-322504, filed Nov. 7, 2005 are expressly incorporated by reference herein.

BACKGROUND

1. Technical Field

The present invention relates to optical element and methods for manufacturing the same, and optical modules and methods for manufacturing the same.

2. Related Art

An optical module may include, for example, a semiconductor optical element (for example, a semiconductor emission element, a semiconductor photodetection element and the like) and lead terminals passing through a stem, which are electrically connected to one another by bonding wires (see, for example, Japanese Laid-open Patent Application JP-A-2004-95824). In this case, the element may be damaged by ultrasonic wave, pressure and/or temperature that are applied to the element at the time of the bonding operation. As a result, the element may be destroyed, or the element may break down after the element is used for an extended period of time. Also, there may be cases where stable bonding conditions that would not inflict damage to elements are difficult to attain.

Further, the characteristics of semiconductor optical elements may change when used in a highly humid environment. For example, the aforementioned reference describes fusing a mounting member on which a semiconductor optical element is mounted and a lens retaining member, to thereby secure airtightness of an internal space that stores the semiconductor optical element.

SUMMARY

In accordance with an aspect of the present invention, a highly reliable optical element and a method for manufacturing the same can be provided. In accordance with another aspect of the invention, an optical module that includes the optical element and a method for manufacturing the same can be provided.

In accordance with an embodiment of the invention, an optical element includes: an optical section having at least one of an emission section and a photodetection section; a sealing member that surrounds at least a part of the optical section through an internal space; an electrode that is electrically connected to the optical section; a conductive member that is contained in the sealing member and conductively connected to the electrode; a substrate that is disposed opposite to an optical surface provided at the optical section; and a wiring that is formed on the substrate and conductively connected to the conductive member, wherein the optical surface is at least one of a plane of light emission and a plane of incidence.

This optical element can have an excellent reliability, because of the following reasons.

The internal space is disposed around at least a part of the optical section. The internal space is kept airtight by the sealing member. As a result, the flow of gas (for example, air or the like) from an external space outside the sealing member to the internal space can be shut off. Therefore the influence of humidity and temperature of the external space that may affect the internal space and at least a part of the optical section can be suppressed. Accordingly, the optical element can have an excellent reliability.

In accordance with another embodiment of the invention, a second optical element includes: an optical section having at least one of an emission section and a photodetection section; a sealing member that surrounds at least a part of the optical section through an internal space; a plurality of electrodes that are electrically connected to the optical section; a plurality of conductive members that are contained in the sealing member and conductively connected to the electrodes, respectively; a substrate that is disposed opposite to an optical surface provided at the optical section; and a plurality of wirings that are formed on the substrate and conductively connected to the conductive member, wherein the optical surface is at least one of a plane of light emission and a plane of light incidence.

In the optical element in accordance with an aspect of the invention, the optical section may be formed above another substrate, the wirings may be formed above the conductive members, and the substrate may be formed above the wirings.

It is noted that, in the descriptions concerning the invention, the term "above" may be used, for example, as "a specific element (hereafter referred to as "A") is formed 'above' another specific element (hereafter referred to as "B")." In the descriptions concerning the invention, the term "above" is used assuming that the case of the example above includes a case in which A is formed directly on B, and a case in which A is formed above B through another element.

In the optical element in accordance with an aspect of the invention, the conductive material may be a spacer between the electrodes and the wirings.

In the optical element in accordance with an aspect of the invention, the conductive member may include a conductive grain and a coating layer that coats the conductive grain.

In the optical element in accordance with an aspect of the invention, the optical section may have the emission section, and the emission section may include a first mirror, an active layer formed above the first mirror and a second mirror formed above the active layer.

In the optical element in accordance with an aspect of the invention, the emission section may have an oxidized constricting layer, and the sealing member may surround at least the oxidized constricting layer.

In the optical element in accordance with an aspect of the invention, the optical section may have the photodetection section, and the photodetection section may include a first semiconductor layer of a first conductivity type, a photoabsorption layer formed above the first semiconductor layer, and a second semiconductor layer of a second conductivity type formed above the photoabsorption layer.

In the optical element in accordance with an aspect of the invention, the optical section may have the emission section and the photodetection section, the emission section may include a first mirror, an active layer formed above the first mirror and a second mirror formed above the active layer, and the photodetection section may include a first semiconductor layer of a first conductivity type, a photoabsorption layer formed above the first semiconductor layer, and a second semiconductor layer of a second conductivity type formed above the photoabsorption layer.

In the optical element in accordance with an aspect of the invention, the internal space may be filled with an inert gas.

The optical element in accordance with an aspect of the invention may have a resin layer formed above the optical surface and in contact with the optical surface and the substrate, and the resin layer may have an index of refraction that is the same as an index of refraction of the substrate.

It is noted that, in the invention, the statement, "the resin layer may have an index of refraction that is the same as an index of refraction of the substrate," includes a case where the index of refraction of the resin layer is exactly the same as the index of refraction of the substrate and a case where the index of refraction of the resin layer is approximately the same as the index of refraction of the substrate.

The optical element in accordance with an aspect of the invention may include a housing that stores at least the optical section, and another sealing member that is formed between the housing and the substrate.

The optical element in accordance with an aspect of the invention may include a heat radiation member formed between the housing and the optical section.

An optical module in accordance with an embodiment of the invention includes any one of the optical elements described above, a mounting member that mounts the optical element, a lead terminal that is provided on the mounting member, and a conductive connection member that conductively connects the wiring and the lead terminal.

In the optical module in accordance with an aspect of the invention, the conductive connection member may be at least one of a conductive paste, an anisotropic conductive film, and a conductive rubber.

In the optical module in accordance with an aspect of the invention, the conductive connection member may be a bonding wire.

In accordance with another embodiment of the invention, a second optical module includes: an optical section having at least one of an emission section and a photodetection section; a sealing member that surrounds at least a part of the optical section through an internal space; an electrode that is electrically connected to the optical section; a conductive member that is contained in the sealing member and conductively connected to the electrode; a substrate that is disposed opposite to an optical surface provided at the optical section; a wiring that is formed on the substrate and conductively connected to the conductive member; and an electronic circuit that is electrically connected to the wiring, wherein the optical surface is at least one of a plane of light emission and a plane of light incidence.

The optical module in accordance with an aspect of the invention may include a plurality of the optical sections, wherein the plurality of the optical sections may be surrounded by a single piece of the sealing member through the internal space.

The optical module in accordance with an aspect of the invention may include a housing that stores at least the optical section and the electronic circuit, and another sealing member formed between the housing and the substrate.

The optical module in accordance with an aspect of the invention may include an optical waveguide formed above the substrate, an optical plug that is formed above the substrate and at one of end sections of the optical waveguide, an optical socket that is formed above the substrate with the optical plug attached thereto, and a reflection section that is formed above the substrate and has at least one of a function of changing a course of light emitted from the optical section by 90 degrees and conducting the light to the optical waveguide and a function of changing a course of light emitted from the optical waveguide by 90 degrees and conducting the light to the optical section.

It is noted that, in the invention, the statement, "changing a course of light by 90 degrees," includes a case where the course of light is changed by approximately 90 degrees.

In accordance with another embodiment of the invention, a third optical module includes: an emission section; a sealing member that surrounds at least a part of the emission section through an internal space; an electrode that is electrically connected to the emission section; a conductive member that is contained in the sealing member and conductively connected to the electrode; a photodetection section; another sealing member that surrounds at least a part of the photodetection section through an internal space; another electrode that is electrically connected to the photodetection section; another conductive member that is contained in the other sealing member and conductively connected to the other electrode; a substrate that is disposed opposite to a plane of emission provided at the emission section and a plane of incidence provided at the photodetection section; a wiring that is formed at the substrate and conductively connected to the conductive member; another wiring that is formed at the substrate and conductively connected to the other conductive member; a partial reflection section that is formed above the emission section to guide a part of light emitted from the emission section to the photodetection section; and an electronic circuit that is electrically connected to the wiring and the other wiring.

The optical module in accordance with an aspect of the invention may include a groove section formed in the substrate on its lower surface side, and a resin layer embedded in the groove section, wherein the resin layer may have an index of refraction different from an index of refraction of the substrate, and the partial reflection section may be formed from an interface between the resin layer and the substrate.

The optical module in accordance with an aspect of the invention may include an optical waveguide formed above the substrate, an optical plug that is formed above the substrate and at one of end sections of the optical waveguide, an optical socket that is formed above the substrate with the optical plug attached thereto, and a reflection section that is formed above the substrate and has at least one of a function of changing a course of light emitted from the optical section by 90 degrees and conducting the light to the optical waveguide and a function of changing a course of light emitted from the optical waveguide by 90 degrees and conducting the light to the optical section, wherein the partial reflection section may be embedded in the optical socket.

An optical transceiver in accordance with an embodiment of the invention has any one of the optical modules described above.

A method for manufacturing an optical element in accordance with an embodiment of the invention includes the steps of forming an optical section having at least one of an emission section and a photodetection section on a first substrate; forming an electrode that is electrically connected to the optical section; forming a sealing member to surround at least a portion of the optical section through an internal space; forming a wiring on a second substrate; and bonding the electrode and the wiring by the sealing member, wherein the optical section is provided with an optical surface that is at least one of a plane of emission and a plane of incidence, the second substrate is disposed opposite to the optical surface, a conductive member is contained in the sealing member, and the conductive member electrically connects the electrode and the wiring.

A method for manufacturing an optical module in accordance with an embodiment of the invention includes the steps of forming an optical section having at least one of an emission section and a photodetection section on a first substrate; forming an electrode that is electrically connected to the optical section; forming a sealing member to surround at least a portion of the optical section through an internal space; forming a wiring on a second substrate; bonding the electrode and the wiring by the sealing member; mounting the first substrate on a mounting member; and conductively connecting a lead terminal provided on the mounting member to the wiring with a conductive connection member, wherein the optical section is provided with an optical surface that is at least one of a plane of emission and a plane of incidence, the second substrate is disposed opposing to the optical surface, a conductive member is contained in the sealing member, and the conductive member electrically connects the electrode and the wiring.

DESCRIPTION OF EXEMPLARY EMBODIMENTS

Preferred embodiments of the present invention are described below with reference to the accompanying drawings.

1. First Embodiment 1.1. First, an optical element 100 in accordance with a first embodiment of the invention is described.

Figure 1:
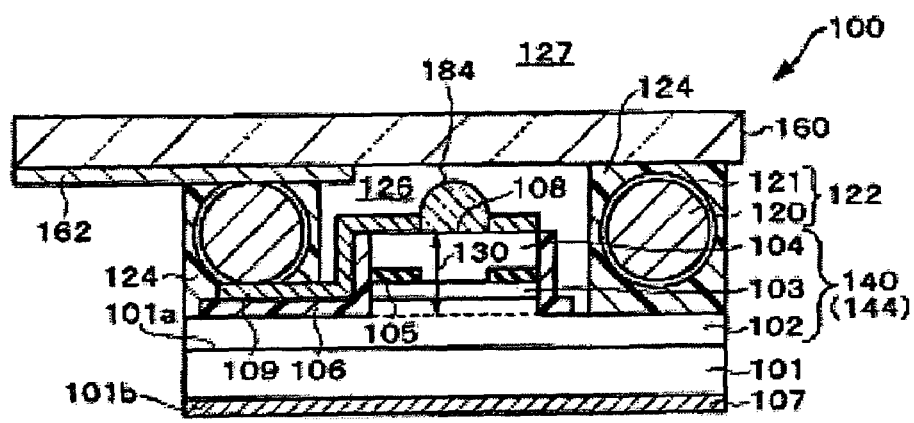
FIG. 1 is a cross-sectional view schematically showing an optical element in accordance with a first embodiment of the invention.
Figure 2:
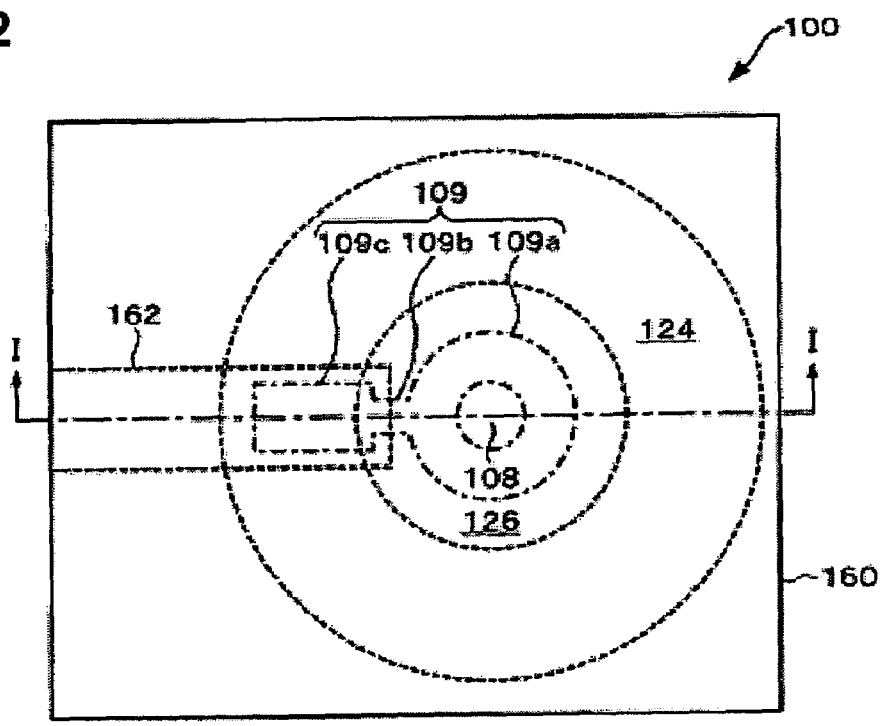
FIG. 2 is a plan view schematically showing the optical element in accordance with the first embodiment.

FIG. 1 is a cross-sectional view schematically showing the optical element 100. FIG. 2 is a plan view schematically showing the optical element 100 shown in FIG. 1. It is noted that FIG. 1 is a cross-sectional view taken along a line I—I in FIG. 2.

The optical element 100 includes, as shown in FIG. 1 and FIG. 2, an optical section 144, a lens section 184, a sealing member 124, a first electrode 107, a second electrode 109, a conductive member 122, a wiring 162, a substrate (hereafter also referred to as a "second substrate") 160, and another substrate (hereafter also referred to as a "first substrate") 101. The present embodiment is described as to a case where the optical section 144 is an emission section 140, and the emission section 140 functions as a surface-emitting type semiconductor laser.

As the first substrate 101, for example, an n-type GaAs substrate or the like can be used.

The emission section 140 is formed on the first substrate 101. The emission section 140 includes a first mirror 102, an active layer 103, and a second mirror 104. More concretely, the emission section 140 is formed from the first mirror 102 that is, for example, a distributed Bragg reflection type (DBR) mirror composed of a semiconductor multilayer film of 40 pairs of alternately laminated n-type $Al_{0.9}Ga_{0.1}As$ layers and n-type $Al_{0.15}Ga_{0.85}As$ layers, the active layer 103 composed of GaAs well layers and $Al_{0.3}Ga_{0.7}As$ barrier layers in which the well layers include a quantum well structure composed of three layers, and the second mirror 104 that is a DBR mirror composed of a semiconductor multilayer film of 25 pairs of alternately laminated p-type $Al_{0.9}Ga_{0.1}As$ layers and p-type $Al_{0.15}Ga_{0.85}As$ layers, which are successively stacked in layers. It is noted that the composition of each of the layers and the number of the layers composing the first mirror 102, the active layer 103 and the second mirror 104 are not particularly limited to the above. The p-type second mirror 104, the active layer 103 that is not doped with an impurity and the n-type first mirror 102 form a pin diode.

A portion among the emission section 140 extending from the second mirror 104 to an intermediate point of the first mirror 102 forms a columnar semiconductor deposited body (hereafter referred to as a "columnar section") 130. It is noted that, the columnar section 130 has a plane configuration that is, for example, a circular shape.

Also, the emission section 140 has an oxidized constricting layer 105. The oxidized constricting layer 105 is, for example, one of the layers composing the second mirror 104. The oxidized constricting layer 105 is formed in a region in proximity to the active layer 103. The oxidized constricting layer 105 can be formed by, for example, an oxidized AlGaAs layer. The oxidized constricting layer 105 is a dielectric layer having an opening section. The oxidized constricting layer 105 is formed in a ring shape. More specifically, the oxidized constricting layer 105 has a cross section, when cut in a plane parallel with a surface 101a of the first substrate 101 shown in FIG. 1, which is a circular ring shape concentric with a circle of the plane configuration of the columnar section 130.

An insulation layer 106 is formed over the first mirror 102 and around the columnar section 130. The insulation layer 106 is formed in a manner to cover the side surface of the columnar section 130. For example, polyimide resin may be used as the insulation layer 106.

The first electrode 107 is formed on a back surface 101b of the first substrate 101. The second electrode 109 is formed over the columnar section 130 and the insulation layer 106. As shown in FIG. 2, the second electrode 109 has a connection section 109a having a ring-shaped plane configuration, a lead-out section 109b having a linear plane configuration, and a pad section 109c having a rectangular plane configuration. The second electrode 109 is electrically connected to the second mirror 104 at the connection section 109a. The lead-out section 109b of the second electrode 109 connects the connection section 109a and the pad section 109c. The pad section 109c of the second electrode 109 can be used as an electrode pad. The connection section 109a of the second electrode 109 has an opening section above the columnar section 130. In other words, the opening section defines a region where the connection section 109a is not provided on the top surface of the second mirror 104. This region defines a plane of emission (hereafter also referred to as an "optical surface") 108 of laser light. Accordingly, by optionally setting the plane configuration and the size of the opening section of the connection section 109a, the configuration and the size of the optical surface 108 can be optionally set. The optical surface 108 has a configuration that is, for example, a circular shape shown in FIG. 2.

The lens section 184 can be formed at least on the optical surface 108. The lens section 184 has a convex configuration, for example, as shown in FIG. 1. The lens section 184 can be formed from an ultraviolet ray setting type resin, a thermosetting type resin or the like. It is noted that the optical surface 108 can be exposed without forming the lens section 184.

In the optical element 100 shown in FIG. 1 and FIG. 2, the first electrode 107 is bonded to the first substrate 101, and the second electrode 109 is bonded to the second mirror 104 on the columnar section 130. An electrical current is injected in the active layer 103 by the first electrode 107 and the second electrode 109.

The sealing member 124 is formed over the first mirror 102, the insulation layer 106 and the second electrode 109, in a manner to surround the columnar section 130. An internal space 126 is formed between the sealing member 124 and the columnar section 130. The sealing member 124 has a plane configuration that is, for example, a circular ring shape shown in FIG. 2. The sealing member 124 can be formed from an ultraviolet ray setting type resin, a thermosetting type resin or the like. When an ultraviolet ray setting type resin is used as the sealing member 124, ultraviolet ray can be irradiated from the side of the second substrate 160. In the present embodiment, an ultraviolet ray setting type epoxy resin that has a short setting time is used as the sealing member 124.

The conductive members 122 are contained in the sealing member 124. In other words, the conductive members 122 are covered by the sealing member 124. The conductive member 122 is granular. The conductive member 122 can function as a spacer between the pad section 109c of the second electrode 109 and the wiring 162. Accordingly, by adjusting the grain size of the conductive member 122, the distance between the pad section 109c of the second electrode 109 and the wiring 162 can be set to a desired value. Further, the distance between the lower surface of the second substrate 160 and the optical surface 108 can also be set to a desired value. The grain size of the conductive member 122 may be, for example, about 1–5 µm.

The conductive member 122 may include a conductive grain 120 and a coating layer 121 that coats the conductive grain 120. The conductive grain 120 has conductivity. The coating layer 121 has non-conductivity. At least one of the conductive members 122 (more concretely, the conductive grains 120) is in contact with the pad section 109c of the second electrode 109. The conductive grain 120 may be formed from, for example, silver, carbon, nickel, palladium or the like. The coating layer 121 may be formed from, for example, epoxy resin, phenol resin, acrylic resin or the like. It is possible for the conductive member 122 not to have the coating layer 121. In other words, for example, when the second electrode 109 and the wiring 162 are independently conductively connected to each other above the first mirror 102, the conductive grain 120 can be used as the conductive member 122 as it is.

The wiring 162 is formed above the conductive member 122. The wiring has a plane configuration that is, for example, a rectangular shape shown in FIG. 2. The wiring 162 is in contact with the conductive member 122 (more concretely, the conductive grain 120) that is in contact with the pad section 109c of the second electrode 109. In other words, the wiring 162 and the second electrode 109 are electrically connected by the conductive member 122. The wiring 162 may be formed from a metal, such as, for example, ITO (Indium-Tin Oxide), chrome (Cr), aluminum (Al), tantalum (Ta), tungsten (W), nickel (Ni), or gold (Au). For example, metals such as ITO (Indium-Tin Oxide), chrome (Cr), aluminum (Al), tantalum (Ta) and tungsten (W) may be deposited by a vacuum vapor deposition method, a sputter method or the like, and metals such as nickel (Ni) and gold (Au) may be deposited by an electroless plating method or the like.

The second substrate 160 is formed over the wiring 162 and the sealing member 124. The second substrate 160 may be formed from a material that can transmit light emitted from the emission section 140. It is noted that it is not necessary for the entire second substrate 160 to transmit light emitted from the emission section 140, and it is permissible if the second substrate 160 can transmit at least light adjacent to an optical axis of the emission section 140. For example, a glass substrate may be used as the second substrate 160.

The second substrate 160 is disposed opposite to the optical surface 108. The internal space 126 is a closed space formed around the columnar section 130. The internal space 126 is kept air-tight by the sealing member 124.

1.2. Next, an example of a method for manufacturing the optical element 100 in accordance with an embodiment of the invention is described with reference to FIG. 1 through FIG. 8. FIG. 3 through FIG. 8 are cross-sectional views schematically showing a process for manufacturing the optical element 100 in accordance with the embodiment shown in FIG. 1 and FIG. 2, and correspond to the cross-sectional view shown in FIG. 1, respectively.

Figure 3:
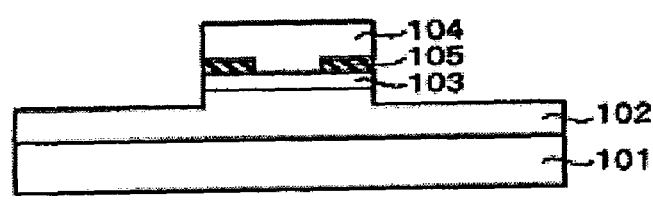
FIG. 3 is a cross-sectional view schematically showing a method for manufacturing an optical element in accordance with the first embodiment.

(1) First, as shown in FIG. 3, for example, an n-type GaAs substrate is used as a first substrate 101.

Next, a semiconductor multilayer film (not shown) is formed on the first substrate 101 by epitaxial growth while modifying its composition. The semiconductor multilayer film is composed of successively laminated semiconductor layers that compose a first mirror 102, an active layer 103 and a second mirror 104. When the second mirror 104 is grown, at least one layer thereof adjacent to the active layer 103 may be used as a layer that is later oxidized and becomes an oxidized constricting layer 105. As the layer that becomes to be the oxidized constricting layer 105, an AlGaAs layer with its Al composition being 0.95 or greater can be used. The Al composition of the AlGaAs layer means an aluminum (Al) composition with respect to III-group elements.

Next, as shown in FIG. 3, the semiconductor multilayer film is patterned, thereby forming the first mirror 102, the active layer 103 and the second mirror 104 in a desired configuration. These layers form a columnar section 130. The semiconductor multilayer film may be patterned by known lithography technique and etching technique.

Next, by placing the first substrate 101 on which the columnar section 130 is formed through the aforementioned steps in a water vapor atmosphere at about 350–400° C., for example, the above-described layer that becomes to be an oxidized constricting layer 105 is oxidized from its side surface, thereby forming the oxidized constricting layer 105. When the emission section 140 having the oxidized constricting layer 105 is driven, electrical current flows only in a portion where the oxidized constricting layer 105 is not formed (a portion that is not oxidized). Accordingly, in the step for forming the oxidized constricting layer 105, the range of the oxidized constricting layer 105 to be formed may be controlled, whereby the current density can be controlled.

Figure 4:
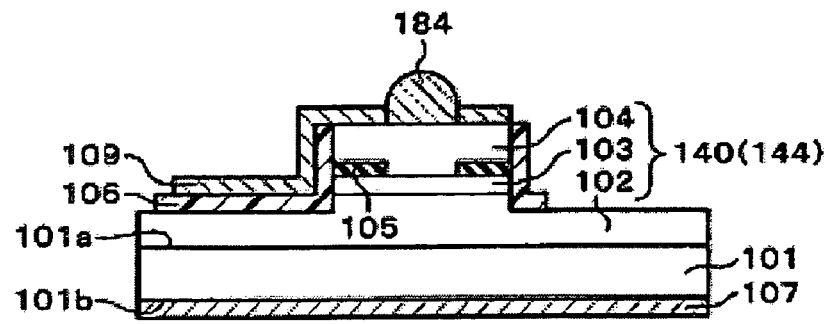
FIG. 4 is a cross-sectional view schematically showing the method for manufacturing an optical element in accordance with the first embodiment.

(2) Next, as shown in FIG. 4, an insulation layer 106 is formed in a manner to surround the columnar section 130. The insulation layer 106 is formed to insulate a lead-out section 109b and a pad section 109c (see FIG. 1 and FIG. 2) of the second electrode 109 from the first mirror 102. In other words, the insulation layer 106 is formed at least below a region where the lead-out section 109b and the pad section 109c of the second electrode 109 are to be formed. For example, when polyimide resin is used as the insulation layer 106, first, a precursor layer (polyimide precursor layer) is formed by using, for example, a spin coat method. Next, the first substrate 101 is heated to remove the solvent, and then placed in a furnace, for example, at about 350° C., to thereby imidize the precursor layer. By this, a polyimide resin layer that is almost completely cured is formed. It is noted that an upper surface of the columnar section 130 can be exposed by using known lithography technique and etching technique. By the steps described above, the insulation layer 106 is formed.

Next, as shown in FIG. 4, a first electrode 107 and a second electrode 109 are formed. First, for example, a laminated film (not shown) of an alloy of chrome (Cr), gold (Au) and zinc (Zn), and gold (Au) is formed on an upper surface of the columnar section 130 and the insulation layer 106 by, for example, a vacuum vapor deposition method. Next, by using a lift-off method or the like, a portion where the laminated film is not formed is formed on an upper surface of the columnar section 130. This portion defines an optical surface 108. Next, for example, a laminated film of an alloy of chrome (Cr), gold (Au) and germanium (Ge), nickel (Ni), and gold (Au) is formed on a back surface 101b of the first substrate 101 by using, for example, a vacuum vapor deposition method. Then, an anneal treatment is conducted in, for example, a nitrogen atmosphere.

By the steps described above, as shown in FIG. 4, the first electrode 107 and the second electrode 109 are formed. It is noted that the order of forming the first electrode 107 and the second electrode 109 is not particularly limited.

Next, as shown in FIG. 4, a lens section 184 is formed at least on the optical surface 108. The lens section 184 may be formed by, for example, a dispenser method, an ink jet method, or the like.

Figure 5:
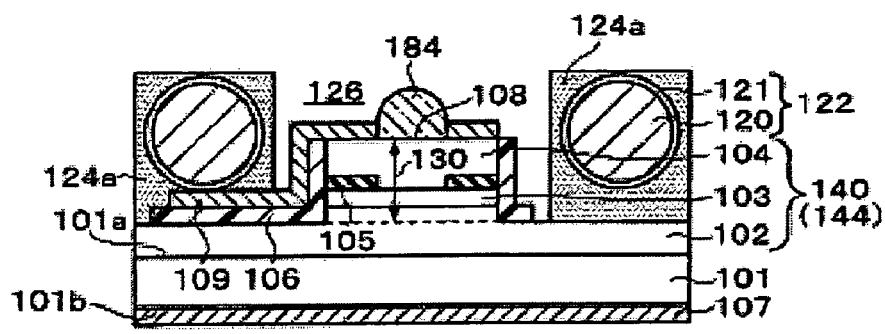
FIG. 5 is a cross-sectional view schematically showing the method for manufacturing an optical element in accordance with the first embodiment.
Figure 6:
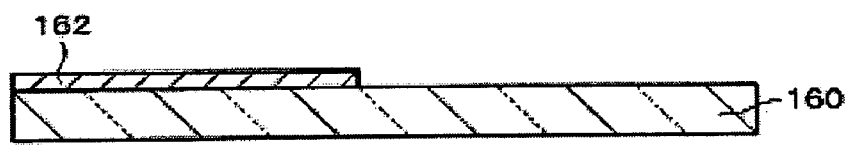
FIG. 6 is a cross-sectional view schematically showing the method for manufacturing an optical element in accordance with the first embodiment.

(3) Next, as shown in FIG. 5, a sealing member precursor 124*a* is formed in a manner to surround the columnar section 130. More concretely, droplets of material for forming the sealing member precursor 124*a* are discharged onto an upper surface of the first mirror 102 and on an upper surface of the pad section 109*c* of the second electrode 109 around the columnar section 130, thereby forming the sealing member precursor 124*a*. Conductive members 122 are contained in the droplets and the sealing member precursor 124*a*. The conductive member 122 is disposed at least on the pad section 109*c* of the second electrode 109. Such placement can be done by, for example, adjusting the mixing ratio of the conductive members 122 within the sealing member precursor 124*a*, the grain size of the conductive members 122 and the like. In the present embodiment, a precursor of ultraviolet ray setting type epoxy resin is used as the sealing member precursor 124*a*. Droplets may be coated by, for example, a dispenser method, a droplet discharge method or the like.

(4) Also, apart from the steps described above, a wiring 162 is formed on a second substrate 160. The wiring 162 may be formed by, for example, a sputter method, an electroless plating method or the like.

Figure 7:
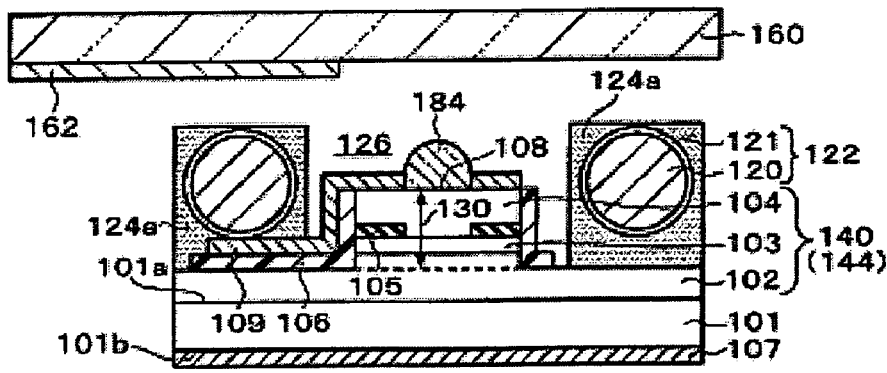
FIG. 7 is a cross-sectional view schematically showing the method for manufacturing an optical element in accordance with the first embodiment.

(5) Next, as shown in FIG. 7, the second substrate 160 with a side thereof having the wiring 162 formed thereon being placed downside, and the first substrate 101 with a side thereof having the sealing member precursor 124*a* formed thereon being placed upside are mutually aligned. This alignment is conducted such that a part of the wiring 162 is located above the pad section 109*c* of the second electrode 109.

Figure 8:
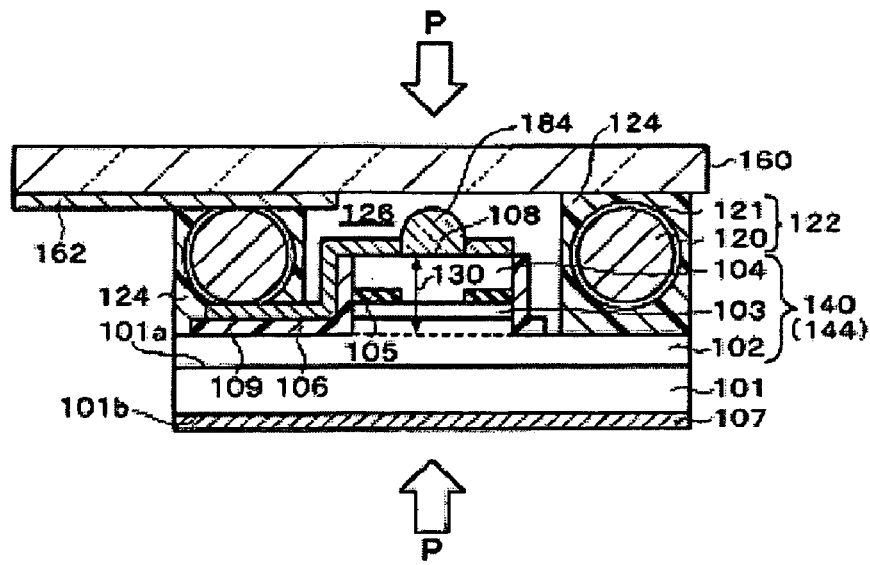
FIG. 8 is a cross-sectional view schematically showing the method for manufacturing an optical element in accordance with the first embodiment.

Next, the second substrate 160 and the wiring 162 are mounted on the sealing member precursor 124*a* in, for example, an inert gas atmosphere. As the inert gas, for example, nitrogen, helium or the like can be used. By conducting the steps up to a step of curing the sealing member precursor 124*a* to be described below in the inert gas atmosphere, the inert gas can be contained in the internal space 126. Next, as shown in FIG. 8, a pressure P is applied to the first electrode 107 from its lower surface side and to the second substrate 160 from its upper surface side. This ruptures portions of the coating layer 121 of the conductive member 122 which are in contact with the pad section 109*c* of the second electrode 109 and the wiring 162. As a result, the pad section 109*c* of the second electrode 109 and the wiring 162 become electrically connected to each other through the conductive grain 120.

Next, the sealing member precursor 124*a* is hardened to form the sealing member 124, as shown in FIG. 8. More concretely, ultraviolet ray is irradiated to the sealing member precursor 124*a* from the side of the second substrate 160 to harden the sealing member precursor 124*a*. By this, the first mirror 102 and the second substrate 160 are bonded through the sealing member 124, and the second electrode 109 and the wiring 162 are conductively connected to each other.

By the steps described above, the optical element 100 in accordance with the present embodiment shown in FIG. 1 and FIG. 2 can be obtained.

1.3. The optical element 100 in accordance with the present embodiment has excellent reliability because of the following reasons.

The internal space 126 is arranged around the columnar section 130 of the optical element 100 in accordance with the present embodiment. The internal space 126 is kept airtight by the sealing member 124. By this, the flow of gas (for example, air or the like) from an external space 127 outside the sealing member 124 to the internal space 126 can be shut off. The insulation layer 106 that surrounds the columnar section 130 of the optical element 100 is made of a hygroscopic material, and is directly in contact with the columnar section 130. Therefore, for example, when the insulation layer 106 absorbs moisture, the moisture directly infiltrates into the columnar section 130. However, according to the present embodiment, the internal space 126 is present between the external space 127 and the insulation layer 106, such that the insulation layer 106 is prevented from absorbing moisture. By this, the influence of humidity and temperature of the external space 127 that may affect the internal space 126, the insulation layer 106 and the columnar section 130 can be suppressed. In particular, because the oxidized constricting layer 105 and the active layer 103 that would likely be affected by the conditions of the external space 127 are disposed inside the internal space 126, their deterioration can be prevented. Concretely, oxidation of aluminum in the oxidized constricting layer 105 and the active layer 103 which may be caused by moisture infiltrating through the insulation layer 106 can be prevented. In other words, the oxidized constricting layer 105 having a high rate of Al composition is preferably disposed inside the internal space 126. Because of the reasons described above, the optical element 100 in accordance with the present embodiment can have an excellent reliability.

Figure 10:
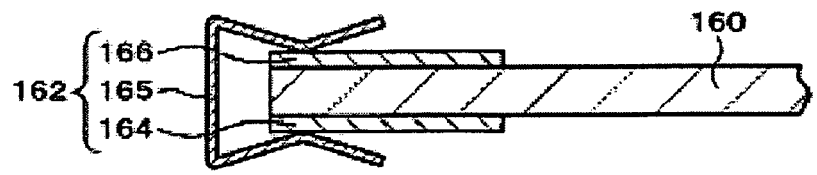
FIG. 10 is a cross-sectional view schematically showing a main portion of the modified example of the optical element in accordance with the first embodiment.
Figure 11:
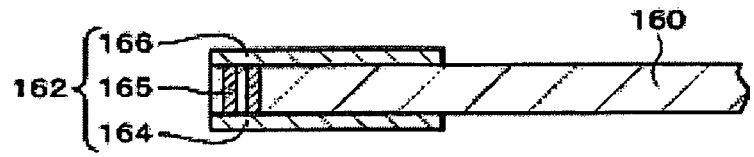
FIG. 11 is a cross-sectional view schematically showing a main portion of the modified example of the optical element in accordance with the first embodiment.
Figure 12:
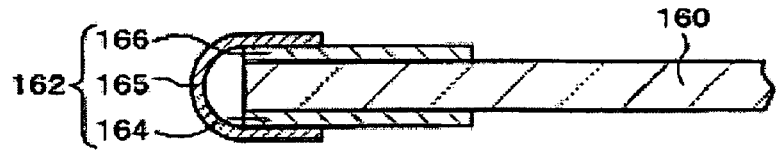
FIG. 12 is a cross-sectional view schematically showing a main portion of the modified example of the optical element in accordance with the first embodiment.

1.4. Next, modified examples of the optical element 100 in accordance with the embodiment are described with reference to the accompanying drawings. It is noted that features different from those of the optical element 100 shown in FIG. 1 and FIG. 2 described above shall be described, and descriptions of similar features shall be omitted. FIG. 9 and FIG. 13 through FIG. 18 are cross-sectional views schematically showing some of modified examples of the optical element 100, and FIG. 10 through FIG. 12 are cross-sectional views schematically showing main portions of some of modified examples of the optical element 100.

Figure 9:
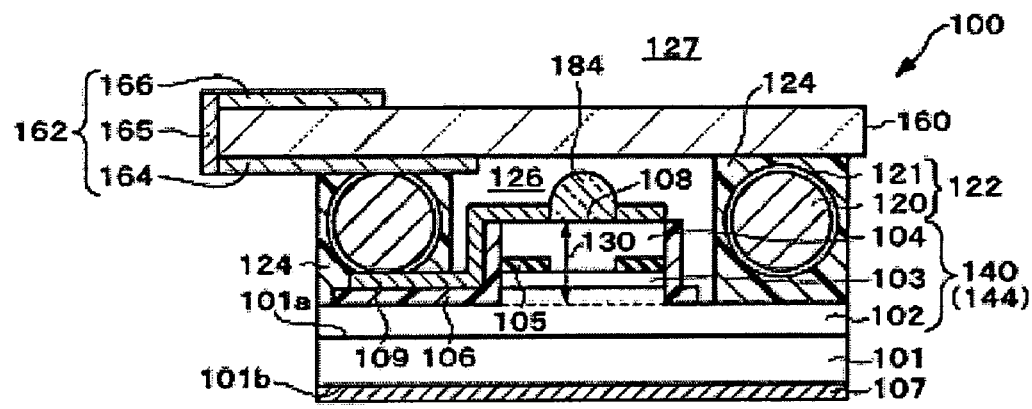
FIG. 9 is a cross-sectional view schematically showing a modified example of the optical element in accordance with the first embodiment.

For example, as shown in FIG. 9, the wiring 162 may include a first conductive section 164 formed on a lower surface of the second substrate 160, a connection section 165 formed on a side surface of the second substrate 160, and a second conductive section 166 formed on an upper surface of the second substrate 160. A conductive material can be used to form the first conductive section 164, the connection section 165 and the second conductive section 166. The first conductive section 164, the connection section 165 and the second conductive section 166 are continuously arranged. In other words, the first conductive section 164, the connection section 165 and the second conductive section 166 are electrically connected to one another. Also, a clip shaped piece shown in FIG. 10, for example, may be used as the connection section 165. Alternatively, a piece that is embedded in a hole penetrating the second substrate 160 shown in FIG. 11, for example, may be used as the connection section 165. In this case, the connection section 165 may be formed by, for example, through-hole plating or the like. Also, a FPC (Flexible Printed Circuit) shown in FIG. 12, for example, may be used as the connection section 165.

Figure 13:
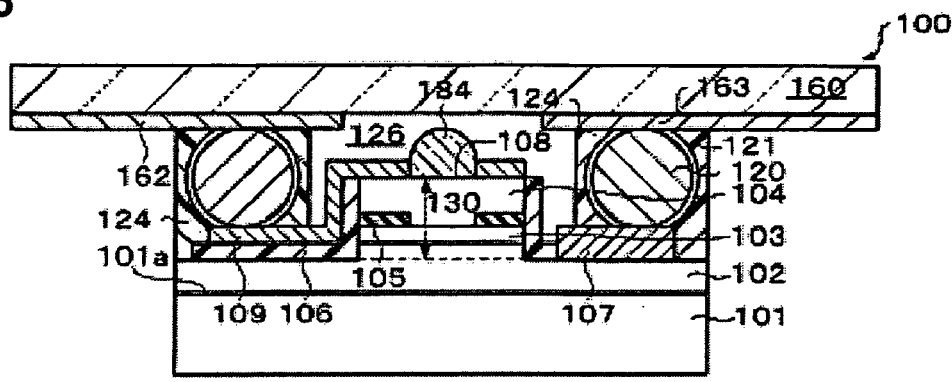
FIG. 13 is a cross-sectional view schematically showing a modified example of the optical element in accordance with the first embodiment.

Also, the first electrode 107 may be provided on an upper surface of the first mirror 102, for example, as shown in FIG. 13. A second wiring 163 that is electrically isolated from the wiring 162 is formed on a lower surface of the second substrate 160. The second wiring 163 is in contact with the conductive member 122 (more concretely, the conductive grain 120) that is in contact with the first electrode 107. In other words, the second wiring 163 and the first electrode 107 are electrically connected to each other by the conductive member 122. The plural conductive members 122 contained in the sealing member 124 have coating layers 121, respectively, such that the conductive members 122 can be prevented from becoming conductive to one another. Accordingly, the wiring 162 and the second wiring 163 can be electrically isolated from each other. In other words, like the modified example shown in FIG. 13, in accordance with the present embodiment of the invention, plural electrodes (for example, the first electrode 107 and the second electrode 109) provided opposite to the second substrate 160 can be electrically isolated from one another, and plural wirings (for example, the wiring 162 and the second wiring 163) provided on the second substrate 160 can be electrically isolated from one another. Further, the electrodes and the wirings can be conductively connected to one another, respectively. By this, the degree of freedom in layout of plural electrodes can be improved, and plural electrodes can be miniaturized, such that the optical element 100 can be made smaller. For example, the same applies to a modified example shown in FIG. 18 to be described below.

Figure 14:
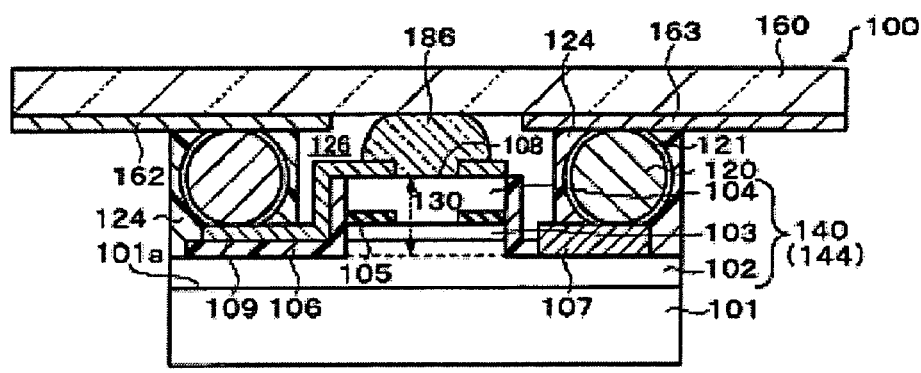
FIG. 14 is a cross-sectional view schematically showing a modified example of the optical element in accordance with the first embodiment.

Also, for example, as shown in FIG. 14, a resin layer 186 may be formed on the optical surface 108 instead of the lens section 184. The resin layer 186 is in contact with the optical surface 108 and a lower surface of the second substrate 160. An internal space 126 is disposed between the resin layer 186 and the sealing member 124. The resin layer 186 has an index of refraction that may be the same (or generally the same) as an index of refraction of the second substrate 160. For example, an underfill material may be used as the resin layer 186. The underfill material is composed of, for example, thermosetting type or ultraviolet ray setting type epoxy resin or acrylic resin. When such an underfill material is used, it is possible to make the index of refraction of the resin layer 186 to be the same as the index of refraction of the second substrate 160 when the resin layer 186 is hardened by heat or irradiation of ultraviolet ray.

In the modified example shown in FIG. 14, the resin layer 186 and the second substrate 160 have the same index of refraction. For this reason, laser light emitted from the plane of emission (optical surface) 108 enters the second substrate 160 without being reflected at the lower surface of the second substrate 160, and therefore does not return to the emission section 140. Accordingly, in accordance with the present modified example, damage to the emission section 140 that may be caused by returning light can be prevented.

Figure 15:
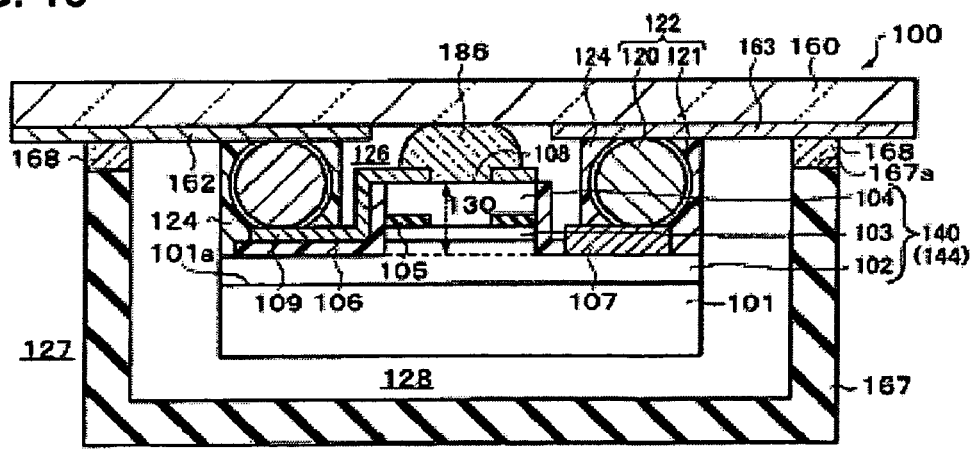
FIG. 15 is a cross-sectional view schematically showing a modified example of the optical element in accordance with the first embodiment.

Also, for example, as shown in FIG. 15, the optical element 100 may have a housing 167 that stores at least the optical section 144. In the example shown in FIG. 15, the housing 167 is provided below the second substrate 160 and covers the first substrate 101, the optical section 144 and the conductive member 122 through a space 128. The housing 167 may be made of ceramics with a concave section formed therein. Another sealing member 168 is formed between the housing 167 and the second substrate 160. In the example shown in FIG. 15, the other sealing member 168 is formed in contact with an upper end face 167a of the housing 167, lower surfaces of the wirings 162 and 163, and a lower surface of the second substrate 160. The other sealing member 168 can be made of, for example, a low melting point glass. The optical section 144 is sealed by the housing 167 and the other sealing member 168. The housing 167 is bonded to the second substrate 160, the wiring 162 and the second wiring 163 by the other sealing member 168. The space 128 formed between the housing 167 and the optical section 144 can be filled (purged) with an inert gas (such as, for example, nitrogen gas). In accordance with the present modified example, the double airtight spaces (the space 128 and the internal space 126) can shut off the flow of gas (for example, air) between the optical section 144 and the external space 127 outside of the housing 167. As a result, the reliability of the optical element 100 can be further improved.

Figure 16:
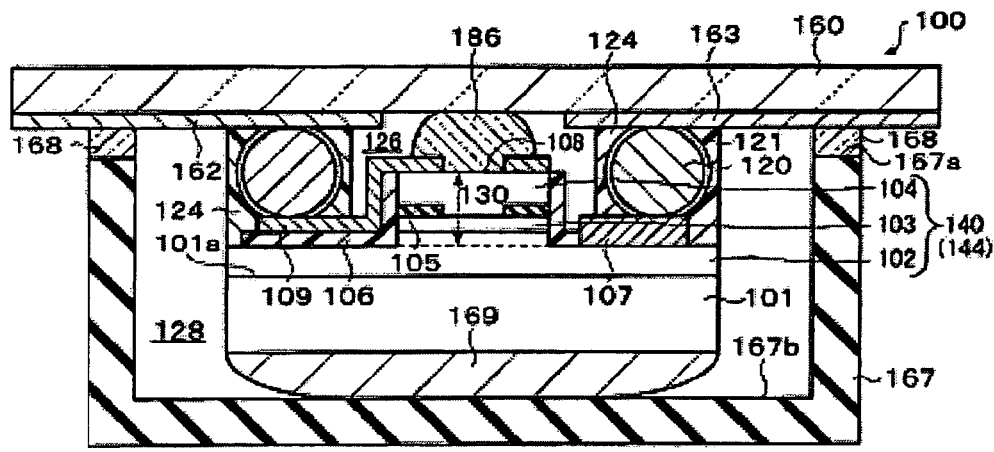
FIG. 16 is a cross-sectional view schematically showing a modified example of the optical element in accordance with the first embodiment.

Also, for example, as shown in FIG. 16, a heat radiation member 169 can be formed between the housing 167 and the optical section 144. In the example shown in FIG. 16, the heat radiation member 169 and the first substrate 101 are provided between the housing 167 and the optical section 144. The heat radiation member 169 is in contact with a bottom surface 167b on the inside of the housing 167 and a lower surface of the first substrate 101. The optical element 100 shown in FIG. 16 may be formed by, for example, die bonding the first substrate 101 with the optical section 144 formed thereon to the housing 167. According to the present modified example, heat generated by the operation of the optical element 100 would readily be conducted to the housing 167 through the heat radiation member 169, which would facilitate heat radiation. By this, the characteristics of the optical element 100 become stable, and its long-term reliability can be further improved.

Figure 17:
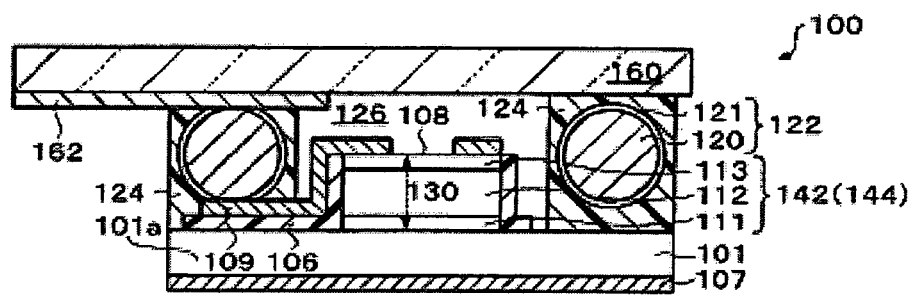
FIG. 17 is a cross-sectional view schematically showing a modified example of the optical element in accordance with the first embodiment.

Also, for example, as shown in FIG. 17, the optical section 144 may be made as a photodetection section 142, and the photodetection section 142 can function as a pin type photodiode. The photodetection section 142 may include an n-type first semiconductor layer 111, a photoabsorption layer 112 formed on the first semiconductor layer 111, and a p-type second semiconductor layer 113 formed on the photoabsorption layer 112. The first semiconductor layer 111 may be formed from, for example, an n-type GaAs layer, the photoabsorption layer 112 may be formed from, for example, a GaAs layer that is not doped with an impurity, and the second semiconductor layer 113 may be formed from, for example, a p-type GaAs layer. In this case, the optical surface 108 defines a plane of light incidence. Also, it is not necessary for the entire second substrate 160 to transmit light that is to be incident upon the photodetection section 142, and it may be sufficient if an area of the second substrate 160 adjacent to the optical axis of the photodetection section 142 permits transmission of light.

Figure 18:
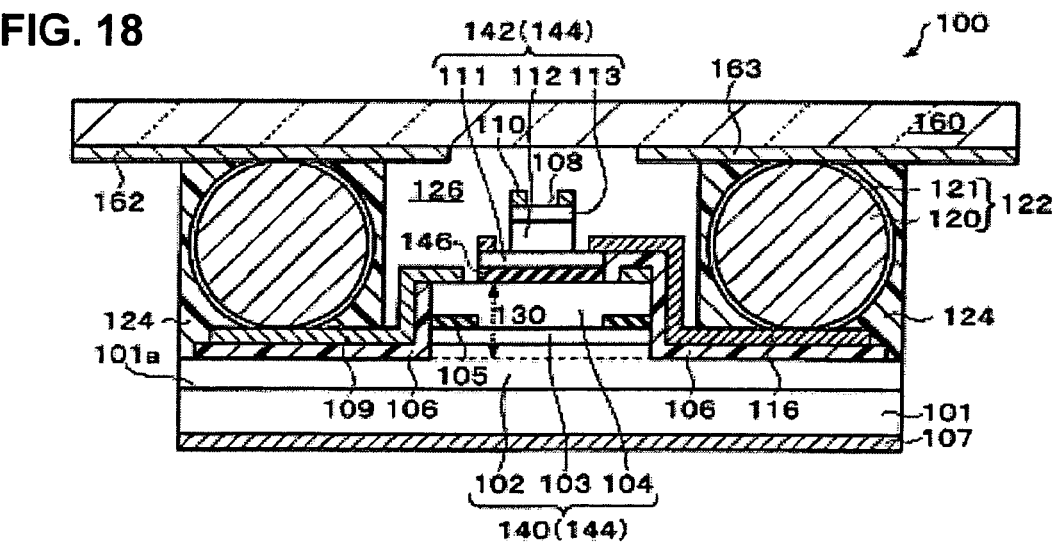
FIG. 18 is a cross-sectional view schematically showing a modified example of the optical element in accordance with the first embodiment.

Also, for example, as shown in FIG. 18, the optical section 144 may include an emission section 140 and a photodetection section 142, the emission section 140 may function as a surface-emitting type semiconductor laser, and the photodetection section 142 may function as a pin type photodiode. The optical element 100 may include the emission section 140, an isolation layer 146 formed on the emission section 140, and the photodetection section 142 formed on the isolation layer 146. The isolation layer 146 can electrically isolate the emission section 140 from the photodetection section 142, and can be composed of, for example, an AlGaAs layer that is not doped with an impurity. The first semiconductor layer 111 is electrically connected to a third electrode 116, and the second semiconductor layer 113 is electrically connected to a fourth electrode 110. Although not shown, the fourth electrode 110 is electrically connected by the conductive member 122 to a third wiring (different from the wiring 162 or the second wiring 163) formed on an under surface of the second substrate 160.

Also, in the example shown in FIG. 18, the second electrode 109 electrically connected to the second mirror 104 is electrically isolated from the third electrode 116 that is electrically connected to the first semiconductor layer 111 (in other words, the optical element 100 has 4 terminals). However, for example, although not shown, the second electrode 109 and the third electrode 116 may be electrically connected to each other (in other words, the optical element 100 has 3 terminals).

Also, in the example described above, one optical section 144 is mounted on the second substrate 160. However, for example, a plurality of optical sections 144 in an array configuration may be mounted on the second substrate 160.

It is noted that the modified examples described above are merely examples, and the invention is not limited to these modified examples.

2. Second Embodiment 2.1. Next, an optical module 500 in accordance with a second embodiment of the invention is described.

Figure 19:
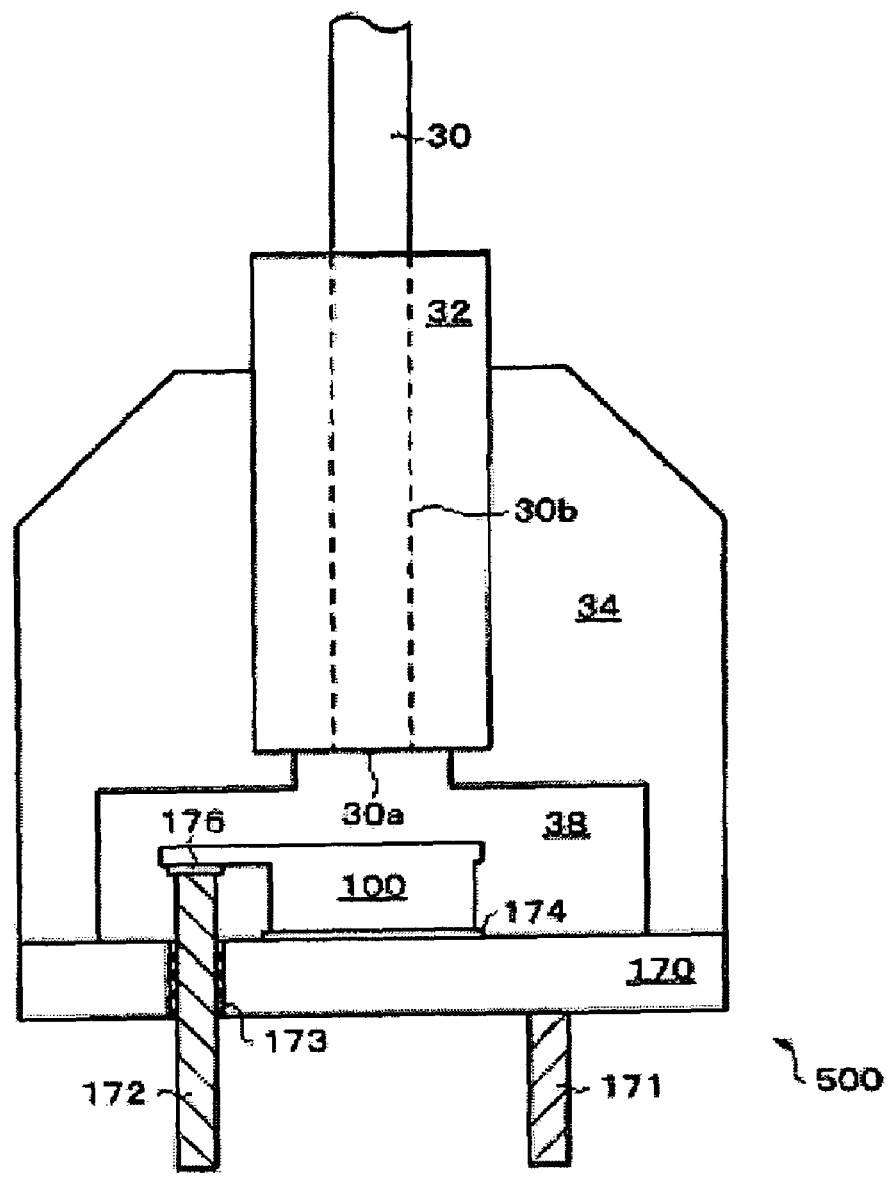
FIG. 19 is a cross-sectional view schematically showing an optical module in accordance with a second embodiment of the invention.
Figure 20:
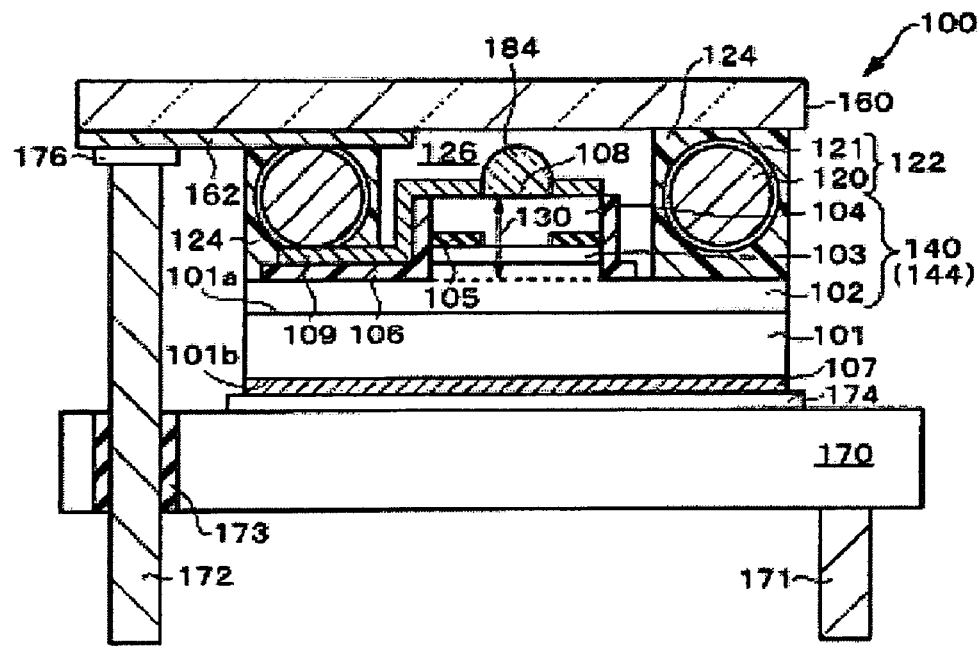
FIG. 20 is a cross-sectional view schematically showing a main portion of the optical module in accordance with the second embodiment of the invention.
Figure 21:
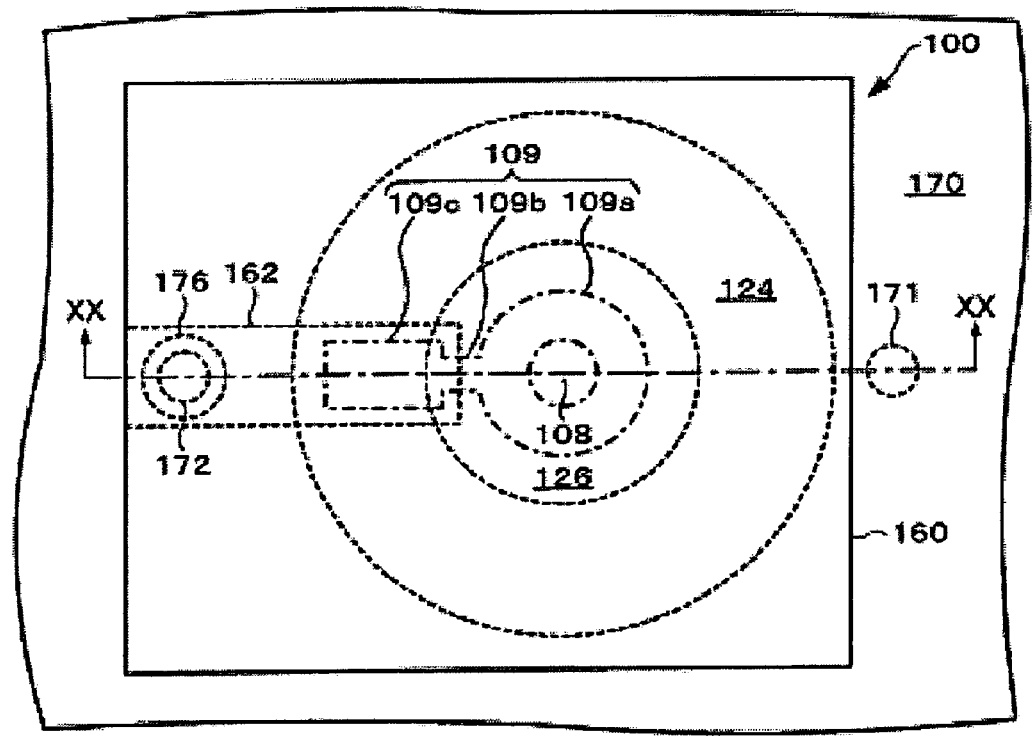
FIG. 21 is a plan view schematically showing the main portion of the optical module in accordance with the second embodiment of the invention.

FIG. 19 is a cross-sectional view schematically showing the optical module 500. FIG. 20 is a cross-sectional view schematically showing a main part of the optical module 500. FIG. 21 is plan view schematically showing a main portion of the optical module 500 shown in FIG. 20. It is noted that FIG. 20 is a cross-sectional view taken along a line XX—XX in FIG. 21.

The optical module 500 includes an optical element 100 in accordance with the first embodiment (including any of the modified examples), a mounting member (stem) 170, a conductive paste 174, a first lead terminal 171, a second lead terminal 172, a conductive connection member 176, an optical fiber (optical waveguide) 30, a fiber folder 34, and a ferrule 32. The present embodiment is described as to the case where an optical section 144 (emission section 140) of the optical element 100 functions as a surface-emitting type semiconductor laser. The optical module 500 is an optical transmission module that introduces laser light emitted from the optical element 100 into the optical fiber 30 to be propagated therein.

The optical element 100 is mounted on the mounting member 170 through the conductive paste 174. In other words, the optical element 100 is bonded to the mounting member 170 by the conductive paste 174 with the side of the optical element 100 having a first electrode 107 being placed downside. By this, the optical surface 108 of the optical element 100 is disposed opposite to an end face 30a of the optical fiber 30. As the conductive paste 174, for example, a paste made of a conductive material and resin mixed and kneaded can be used. The conductive material may be composed of, for example, silver, carbon, nickel, palladium or the like. The resin may be composed of epoxy resin, phenol resin, acrylic resin or the like.

One end of the first lead terminal 171 is connected to the mounting member 170. Accordingly, the first lead terminal 171 is electrically connected to the first electrode 107 through the mounting member 170 and the conductive paste 174. The second lead terminal 172 is disposed penetrating the mounting member 170. The second lead terminal 172 is insulated from the mounting member 170 by an insulation layer 173. One end of the second lead terminal 172 is connected to a lower surface of a wiring 162 by a conductive connection member 176. Accordingly, the second lead terminal 172 is electrically connected to a second electrode 109 through the conductive connection member 176, the wiring 162 and a conductive grain 120. As the conductive connection member 176, for example, the conductive paste described above, an anisotropic conductive film (ACF) formed from conductive particles dispersed in a thermoplastic or thermosetting resin film, a conductive rubber formed from conductive particles dispersed in rubber or conductive filaments embedded in rubber can be used.

The optical element 100 is disposed in the fiber folder 34. A space 38 is present between the optical element 100 and the fiber folder 34.

The ferule 32 is attached inside the fiber folder 34 above the optical element 100. The end section 30b of the optical fiber 30 is provided inside the ferule 32. In other words, the end section 30b of the optical fiber 30 is inserted in the ferule 32.

It is noted that, in the illustrated example, the optical module 500 is formed between the optical element 100 and the optical fiber 30 without any optical component (for example, a lens) being placed in between. However, an optical component can be provided between the optical element 100 and the optical fiber 30.

Figure 22:
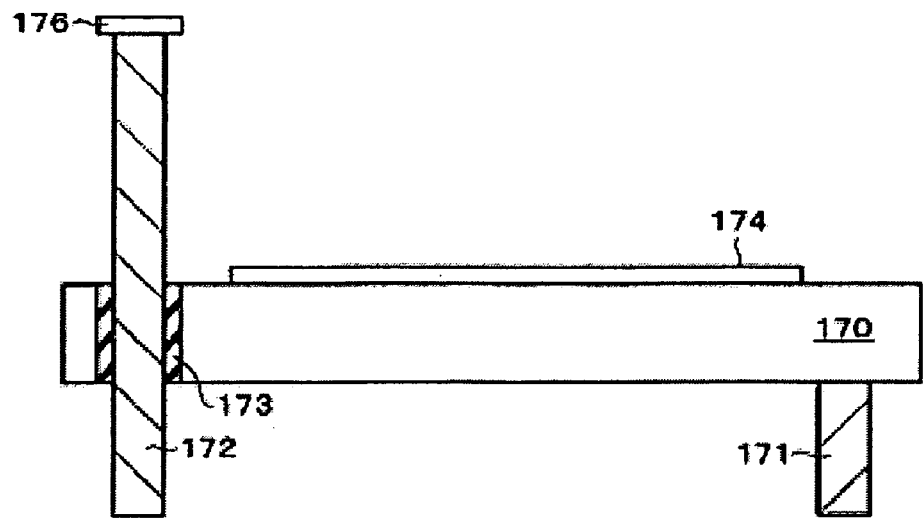
FIG. 22 is a cross-sectional view schematically showing a method for manufacturing an optical module in accordance with the second embodiment.
Figure 23:
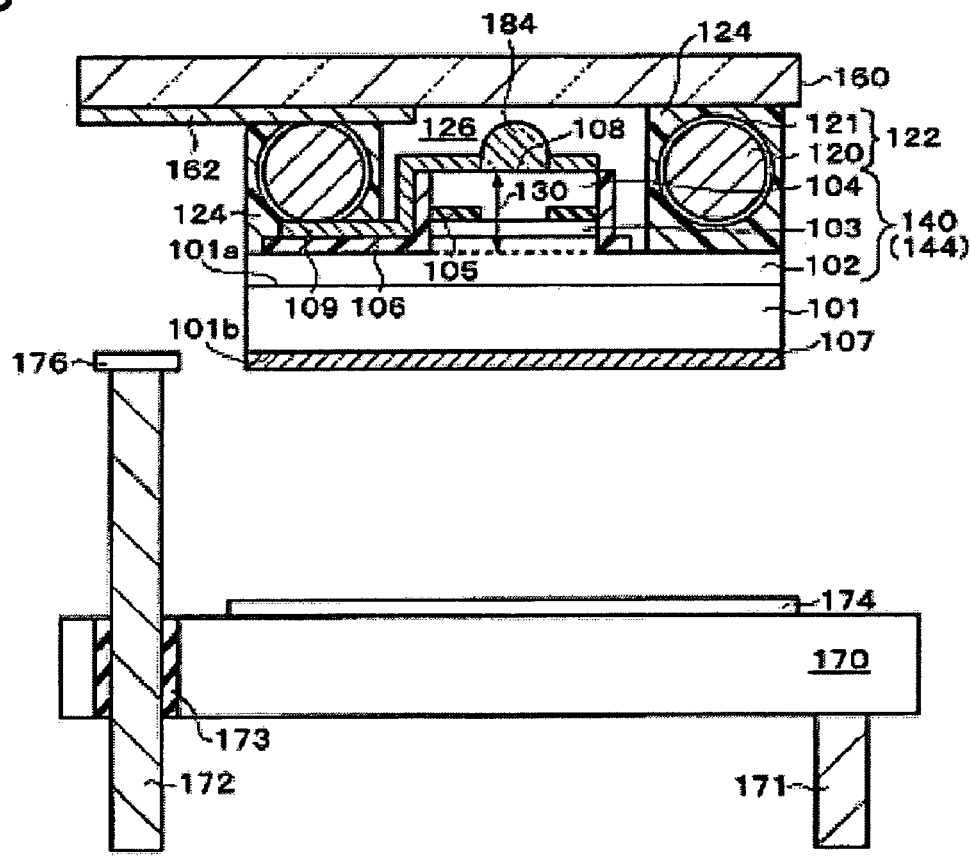
FIG. 23 is a cross-sectional view schematically showing the method for manufacturing an optical module in accordance with the second embodiment.
Figure 24:
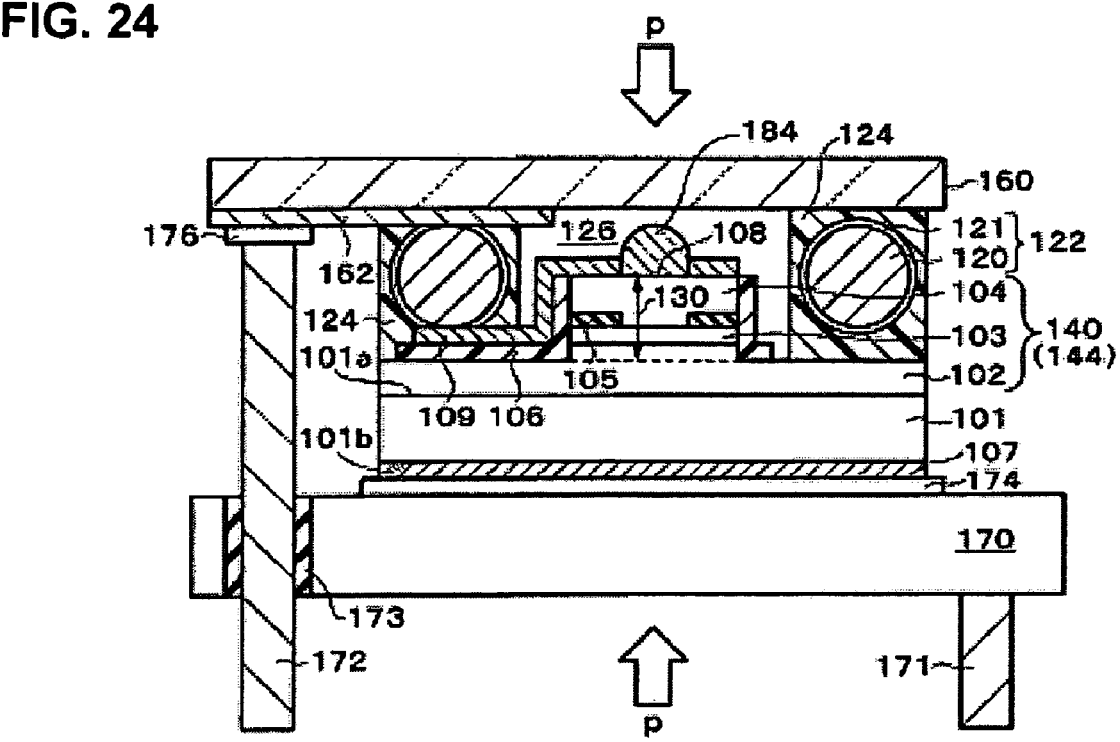
FIG. 24 is a cross-sectional view schematically showing the method for manufacturing an optical module in accordance with the second embodiment.

2.2. Next, one example of a method for manufacturing the optical module 500 in accordance with the present embodiment is described with reference to FIG. 19 through FIG. 24. FIG. 22 through FIG. 24 are cross-sectional views of a main portion of the optical module 500 in accordance with the present embodiment schematically showing its manufacturing process, and correspond to the cross-sectional view shown in FIG. 20, respectively.

(1) First, as shown in FIG. 22, a conductive paste 174 is formed on a mounting member 170 with first and second lead terminals 171 and 172 mounted thereon. The conductive paste 174 may be formed by, for example, a dispenser method. Also, as shown in FIG. 22, a conductive connection member 176 is formed on top of the second lead terminal 172. The conductive connection member 176 may be formed by, for example, a dispenser method. It is noted that, when a conductive paste is used as the conductive connection member 176, the conductive connection member 176 and the conductive paste 174 may be formed by the same process.

(2) Next, as shown in FIG. 23, the optical element 100 in accordance with the first embodiment with a side thereof having the first electrode 107 formed thereon being placed downside, and the mounting member 170 with a side thereof having the conductive paste 174 formed thereon being placed upside are mutually aligned. The alignment is conducted such that the first electrode 107 is positioned above the conductive paste 174, and a part of the wiring 162 is positioned above the conductive connection member 176.

(3) Next, as shown in FIG. 24, the optical element 100 is mounted on the conductive paste 174 and the conductive connection member 176. More concretely, the first electrode 107 is mounted on the conductive paste 174, and the wiring 162 is mounted on the conductive connection member 176. Next, as shown in FIG. 24, a pressure p is applied to the mounting member 170 from its lower surface side and to the second substrate 160 from its upper surface side. Next, heat is applied to at least the conductive paste 174 and the conductive connection member 176, thereby hardening them. By this, the first mirror 102 is conductively connected to the second substrate 160 through the conductive paste 174, and the second electrode 109 is conductively connected to the wiring 162 through the conductive connection member 176.

(4) Next, as shown in FIG. 19, an end section 30b of the optical fiber 30 is inserted in the ferule 32, and the ferule 32 is attached to the fiber folder 34. Next, while energizing the optical element 100 for adjusting its center, the fiber folder 34 is bonded to the mounting member 170 on which the optical element 100 is mounted. The center adjustment may be conducted such that light emitted from the optical element 100 can be conducted inside the optical fiber 30, or the maximum amount of light conducted from the optical fiber 30 can be received by the optical element 100. As the center adjustment method, a method in which an alignment mark provided on at least one of the optical element 100 and the mounting member 170 or the configuration of the optical section 144 of the optical element 100 is observed by an image recognition method may be conducted.

By the steps described above, as shown in FIG. 19 through FIG. 21, the optical module 500 in accordance with the present embodiment can be obtained.

2.3. According to the optical module 500 in accordance with the present embodiment, even if the space 38 within the fiber folder 34 is not kept in an airtight state, the internal space 126 is kept airtight as described above, such that an excellent reliability of the optical element 100 can be secured. Accordingly, the structure of the optical module 500, in particular, the structure of bonded sections of the respective members (for example, the fiber folder 34, the mounting member 170 and the like) which surround the space 38 can be simplified. Also, for example, when the space 38 within the fiber folder 34 is kept in an airtight state, the reliability of the optical element 100 can be further improved.

Also, according to the optical module 500 in accordance with the present embodiment, the second lead terminal 172 and the second electrode 109 can be electrically connected to each other without conducting wire bonding (in other words, without using bonding wires). In other words, influences of ultrasonic waves, pressure, heat generated by ultrasonic waves and the like that occur at the time of wire bonding, which may affect the optical element 100 (in particular, the optical section 144), can be eliminated. As a result, the optical module 500 has an excellent reliability, and can stably operate for an extended period of time, compared to the case where wire bonding is conducted.

2.4. Next, modified examples of the optical module 500 in accordance with the present embodiment of the invention are described with reference to the accompanying drawings. It is noted that features different from those of the optical module 500 shown in FIG. 19 through FIG. 21 and described above shall be described, and descriptions of similar features shall be omitted. FIG. 25 through FIG. 28 are cross-sectional views of main portions of some of modified examples of the optical module 500.

Figure 25:
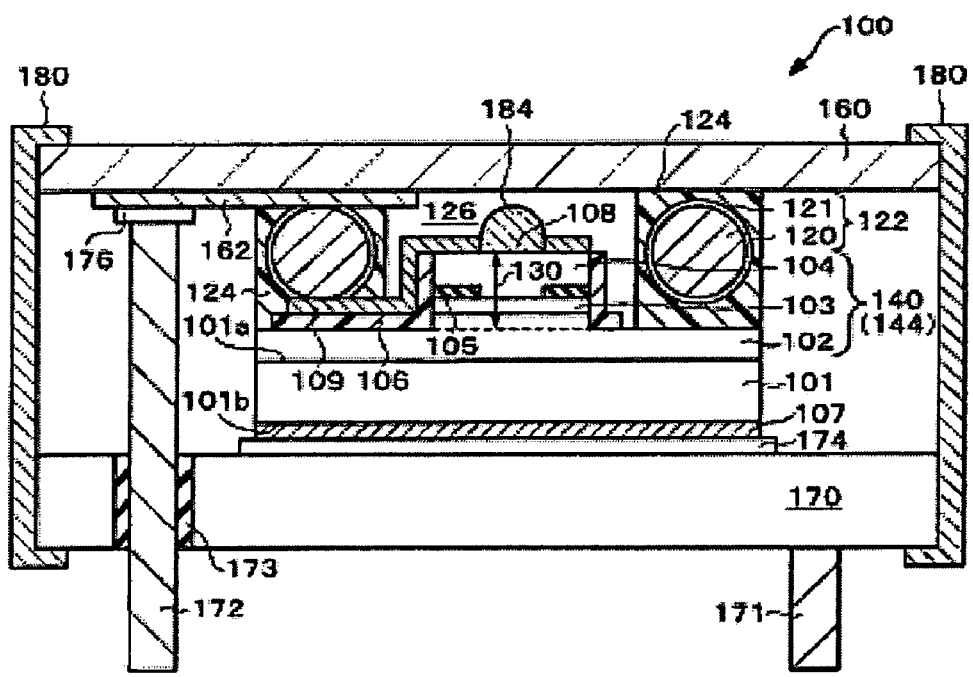
FIG. 25 is a cross-sectional view schematically showing a modified example of the optical module in accordance with the second embodiment.

For example, as shown in FIG. 25, the mounting member 170 and the second substrate 160 can be affixed by a fixing member 180. The fixing member 180 affixes the mounting member 170 from its lower surface side, and the second substrate 160 from its upper surface side. The use of the fixing member 180 is particularly effective when conductive rubber is used as the conductive connection member 176.

Figure 26:
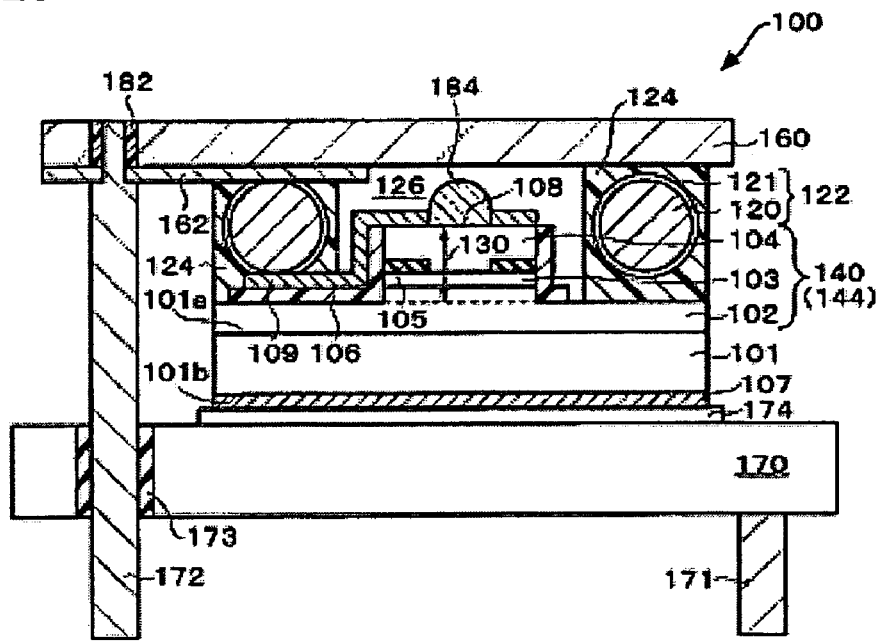
FIG. 26 is a cross-sectional view schematically showing a modified example of the optical module in accordance with the second embodiment.

Also, for example, as shown in FIG. 26, a hole that penetrates the second substrate 160 may be formed, and the second lead terminal 172 may be inserted in the hole. More concretely, an end section of the second lead terminal 172, which is to be inserted in the second substrate 160, is formed in a stepped shape (a stepped pin shape), and a thinner portion at the stepped end section can be inserted in the second substrate 160. The second lead terminal 172 and the second substrate 160 can be affixed together by an adhesive member 182. Any known adhesive member can be used as the adhesive member 182. In the case of this modified example, the levelness of the optical element 100 is determined by the stepped portion of the second lead terminal 172. By this, the positional relation between the mounting member 170 and the fiber folder 34, as well as the positional relation between the optical element 100 and the optical fiber 30 are accurately determined, such that the center adjustment work in the housing step can be alleviated.

Figure 27:
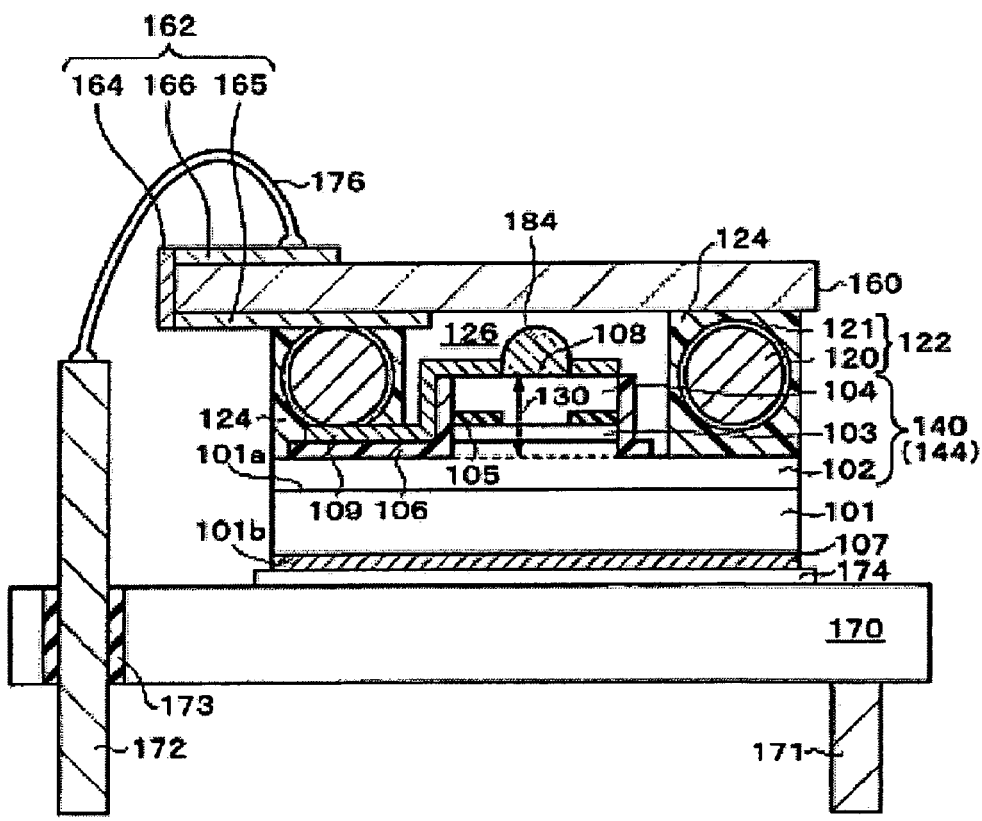
FIG. 27 is a cross-sectional view schematically showing a modified example of the optical module in accordance with the second embodiment.

Also, for example, as shown in FIG. 27, the wiring 162 and the second lead terminal 172 can be connected by wire bonding. More concretely, an upper surface of the second conductive section of the wiring 162 and an upper end surface of the second lead terminal 172 are connected to each other by a bonding wire (conductive connection member) 176. For example, a gold fine line or the like can be used as the bonding wire 176. According to this modified example, the wiring 162 and the second lead terminal 172 can be connected by an ordinary wire bonding method. Accordingly, an ordinary wire bonding technique can be used as it is. Also, according to this modified example, the section at which the wire 162 and the bonding wire 176 are connected is away from the optical section 144 farther, for example, compared to a case where the bonding wire 176 is directly connected to the second electrode 109. Also, the internal space 126 is arranged within the optical element 100. As a result, ultrasonic wave, pressure, heat generated by ultrasonic wave and the like that occur at the time of wire bonding would be applied to the second substrate 160, but not directly applied to the optical section 140, such that their influences on the optical element 100 (in particular, the optical section 144) can be suppressed.

Figure 28:
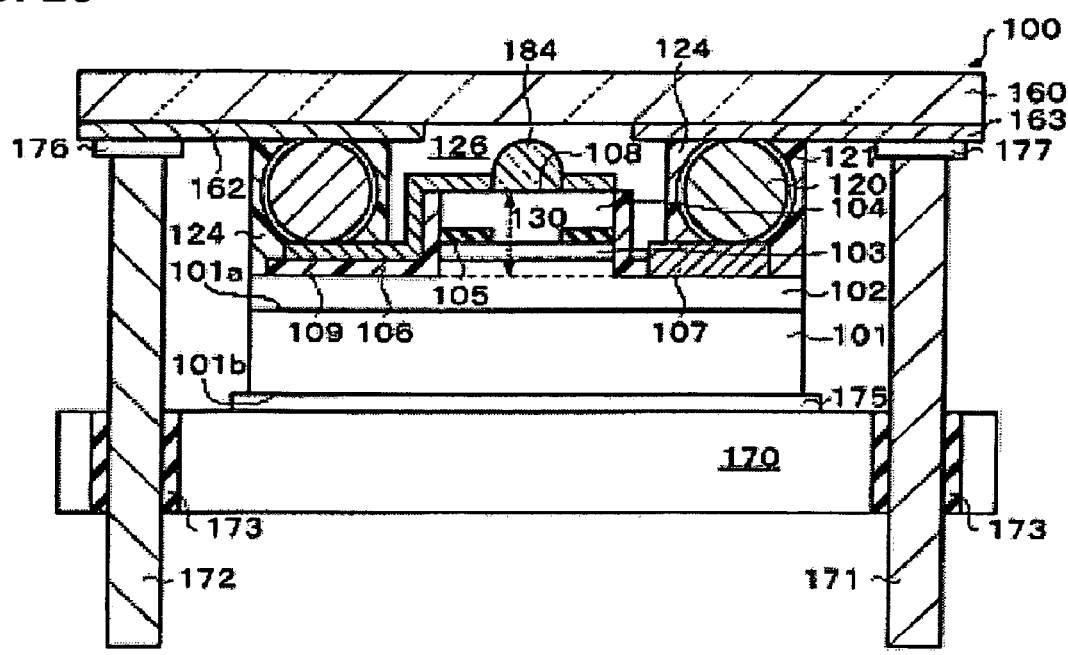
FIG. 28 is a cross-sectional view schematically showing a modified example of the optical module in accordance with the second embodiment.

Also, for example, as shown in FIG. 28, the first lead terminal 171 may be arranged in a manner to penetrate the mounting member 170, and one of the end sections of the first lead terminal 171 may be connected to a lower surface of the second wiring 163 by a second conductive connection member 177. Accordingly, the first lead terminal 171 is electrically connected to the first electrode 107 through the second conductive connection member 177, the second wiring 163 and the conductive grain 120. The mounting member 170 and the first substrate 101 are affixed to each other by an adhesive member 175. Any known adhesive member can be used as the adhesive member 175. In the case of this modified example, the adhesive member 175 may be acceptable without conductivity. Also, the first substrate 101 can be directly mounted on the mounting member 170 without providing the adhesive member 175.

It is noted that the modified examples described above are merely examples, and the invention is not limited to these modified examples.

3. Third Embodiment 3.1. Next, an optical module 300 in accordance with a third embodiment of the invention is described.

Figure 29:
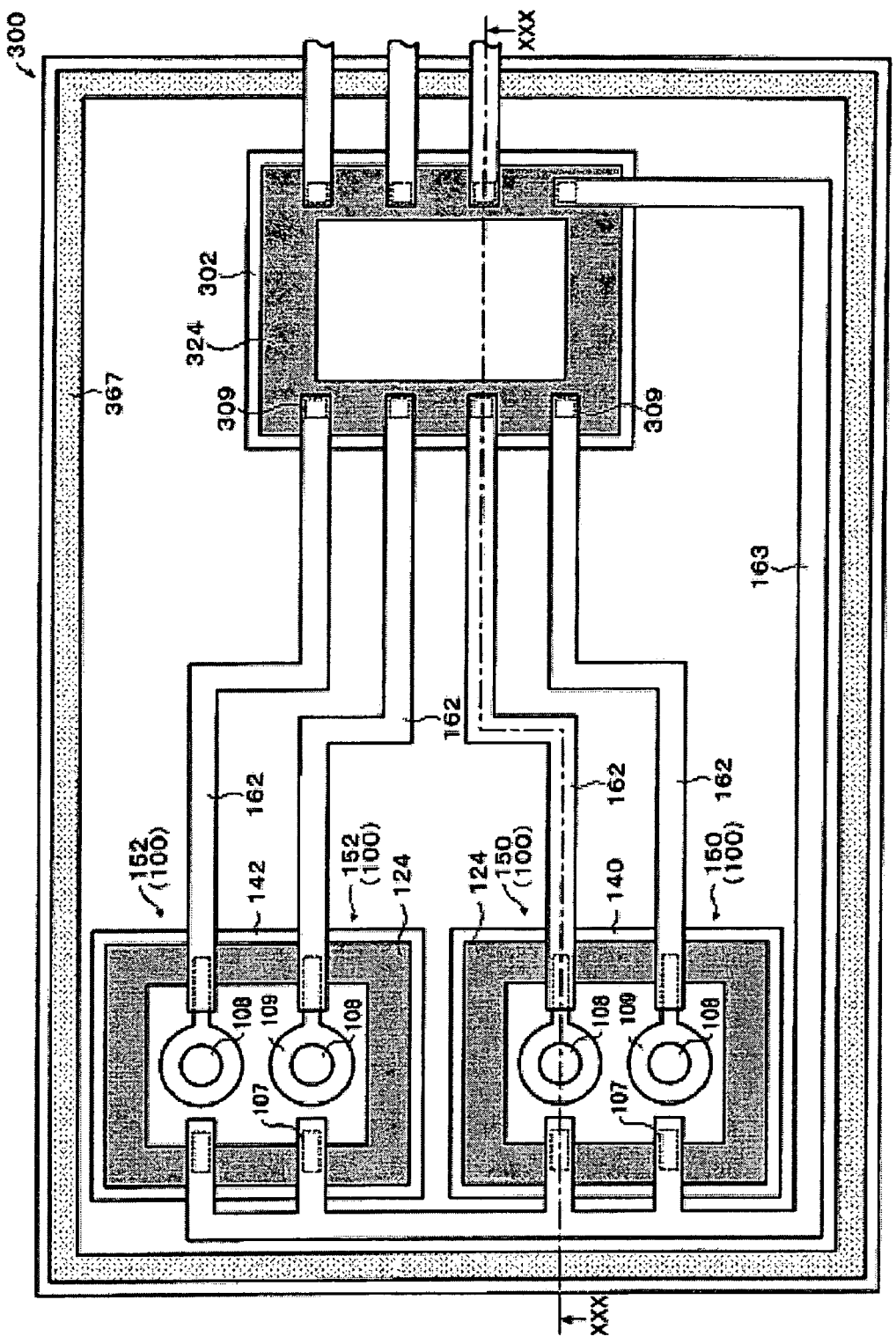
FIG. 29 is a plan view schematically showing an optical module in accordance with a third embodiment of the invention.
Figure 30:
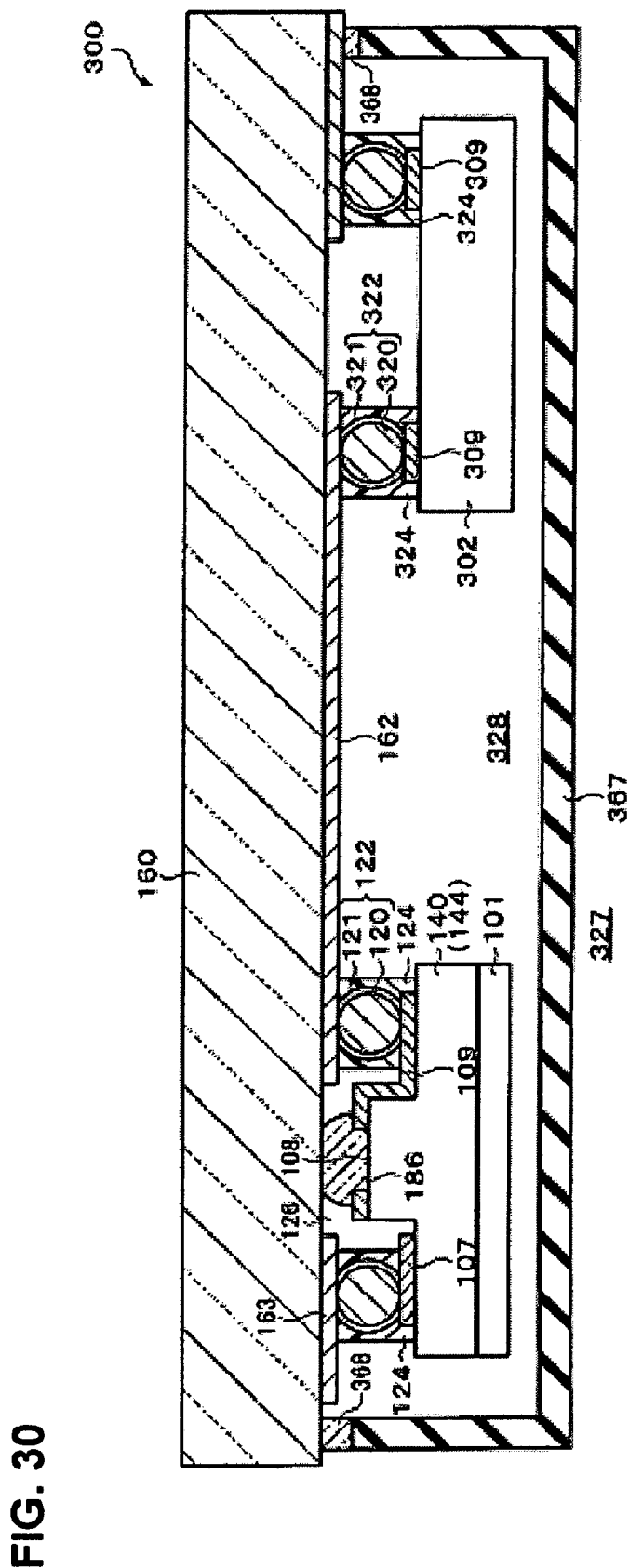
FIG. 30 is a cross-sectional view schematically showing the optical module in accordance with the third embodiment of the invention.

FIG. 29 is a plan view schematically showing the optical module 300. FIG. 30 is a cross-sectional view schematically showing the optical module 300. It is noted that FIG. 30 is a cross-sectional view taken along a line XXX—XXX of FIG. 29. Also, illustration of some members is omitted for convenience' sake.

The optical module 300 includes optical elements 100 in accordance with the first embodiment (including its modified examples), and an electronic circuit 302. In the optical element 100 in accordance with the present embodiment, members that are substantially the same as those of the optical element in accordance with the first embodiment are appended with the same reference numbers, and their detailed descriptions are omitted. It is noted that, although FIG. 29 and FIG. 30 show the optical element 100 in which a resin layer 186 is formed between a plane of emission 108 of an optical element 150 having an emission section and a second substrate 160 (see, for example, FIG. 14), the optical element 100 is not limited to this type.

The optical module 300 may have a plurality of optical elements 100, as shown in FIG. 29. The optical module 300 may include, for example, two optical elements 150 each having an emission section, and two optical elements 152 each having a photodetection section. The optical elements 150 having the emission sections and the optical elements 152 having the photodetection sections are each arranged in an array configuration, as shown in FIG. 29. Each of the optical elements 150 and 152 is provided with a first electrode 107 and a second electrode 109 formed therein. The electrodes 107 and 109 are conductively connected to wirings 162 and 163 formed on the second substrate 160, respectively, through conductive members 122 contained in a sealing member 124, as described in the first embodiment.

The electronic circuit 302 may be a driver IC or the like for driving the optical elements 150 and 152. Bumps 309 are formed in the electronic circuit 302 for input and output of electrical signals. The bumps 309 may be conductively connected to the wirings 162 and 163 formed on the second substrate 160 by conductive members 322 contained in sealing members 324. By this, the electronic circuit 302 can be electrically connected to each of the wirings (for example, the wirings 162 and 163). The conductive members 322 include conductive grains 320 and coating layers 321. As the sealing member 324 and the conductive member 322, those similar to the sealing member 124 and the conductive member 122 of the optical element 100 may be used. According to the optical module 300 in accordance with the present embodiment, the pitch between the bumps 309 or the pitch between the wirings 162 and 163 becomes narrow, the bumps and the corresponding wirings can be securely conductively connected without undesirably short-circuiting the bumps 309 and the wirings 162 and 163. It is noted that the electronic circuit 302 and the wirings may be connected by, for example, a flip-chip bonding method, an anisotropic conductive film method, a solder reflow method or the like.

Figure 31:
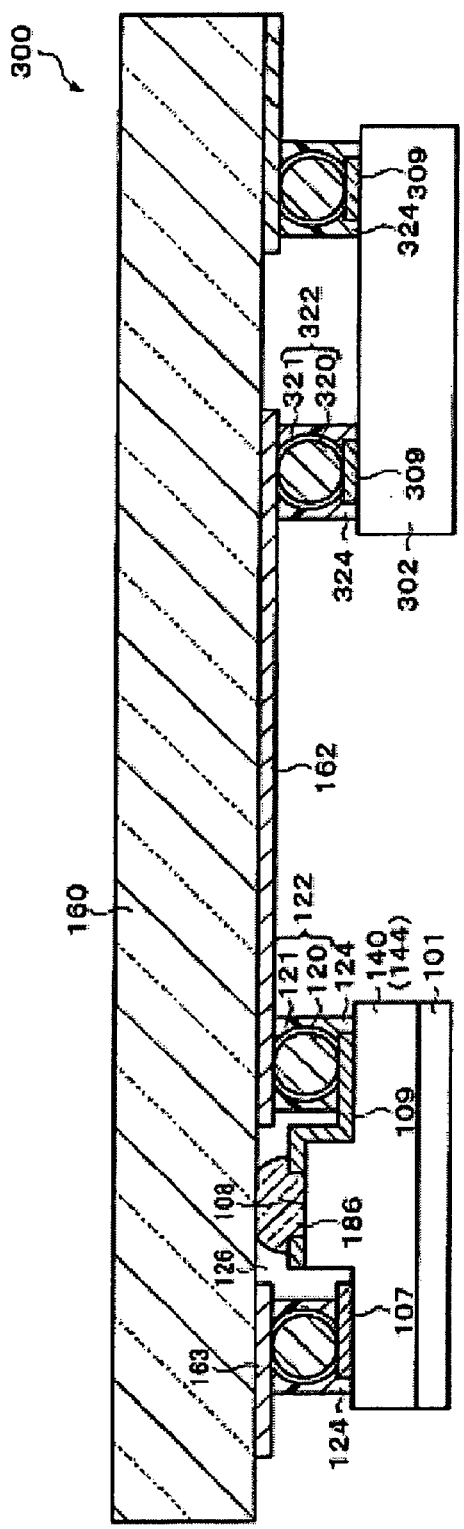
FIG. 31 is a cross-sectional view schematically showing the optical module in accordance with the third embodiment of the invention.

The optical element 100 may have a housing 367 that stores at least the optical sections 144 and the electronic circuit 302, as shown in FIG. 29 and FIG. 30. The housing 367 covers the optical sections 144 and the electronic circuit 302 formed below the second substrate 160 through a space 328. The housing 367 may be made of ceramics with a concave section formed therein. Another sealing member 368 is formed between the housing 367 and the second substrate 160. The other sealing member 368 can be made of, for example, a low melting point glass. The optical sections 144 and the electronic circuit 302 are sealed by the housing 367 and the other sealing member 368. The housing 367 is bonded to the second substrate 160 and a part of the wirings by the other sealing member 368. The space 328 formed between the housing 367 and the optical sections 144 and the housing 367 and the electronic circuit 302 can be filled (purged) with an inert gas (such as, for example, nitrogen gas). According to the optical module 300 in accordance with the present embodiment, the double airtight spaces (the space 328 and the internal space 126) can shut off the flow of gas (for example, air) between the optical sections 144 and the external space 327 outside of the housing 367. As a result, the reliability of the optical elements 100 can be further improved. It is noted that, in the illustrated example, the optical elements 150 having emission sections in an array configuration, the optical elements 152 having photodetection sections in an array configuration, and the electronic circuit 302 are sealed together by the housing 367. However, they can be individually sealed. Also, it is possible that the optical module 300 in accordance with the present embodiment may not be provided with the housing 367 or the other sealing member 368, for example, as shown in FIG. 31. FIG. 31 is a cross-sectional view schematically showing the optical module 300, and corresponds to FIG. 30.

Figure 32:
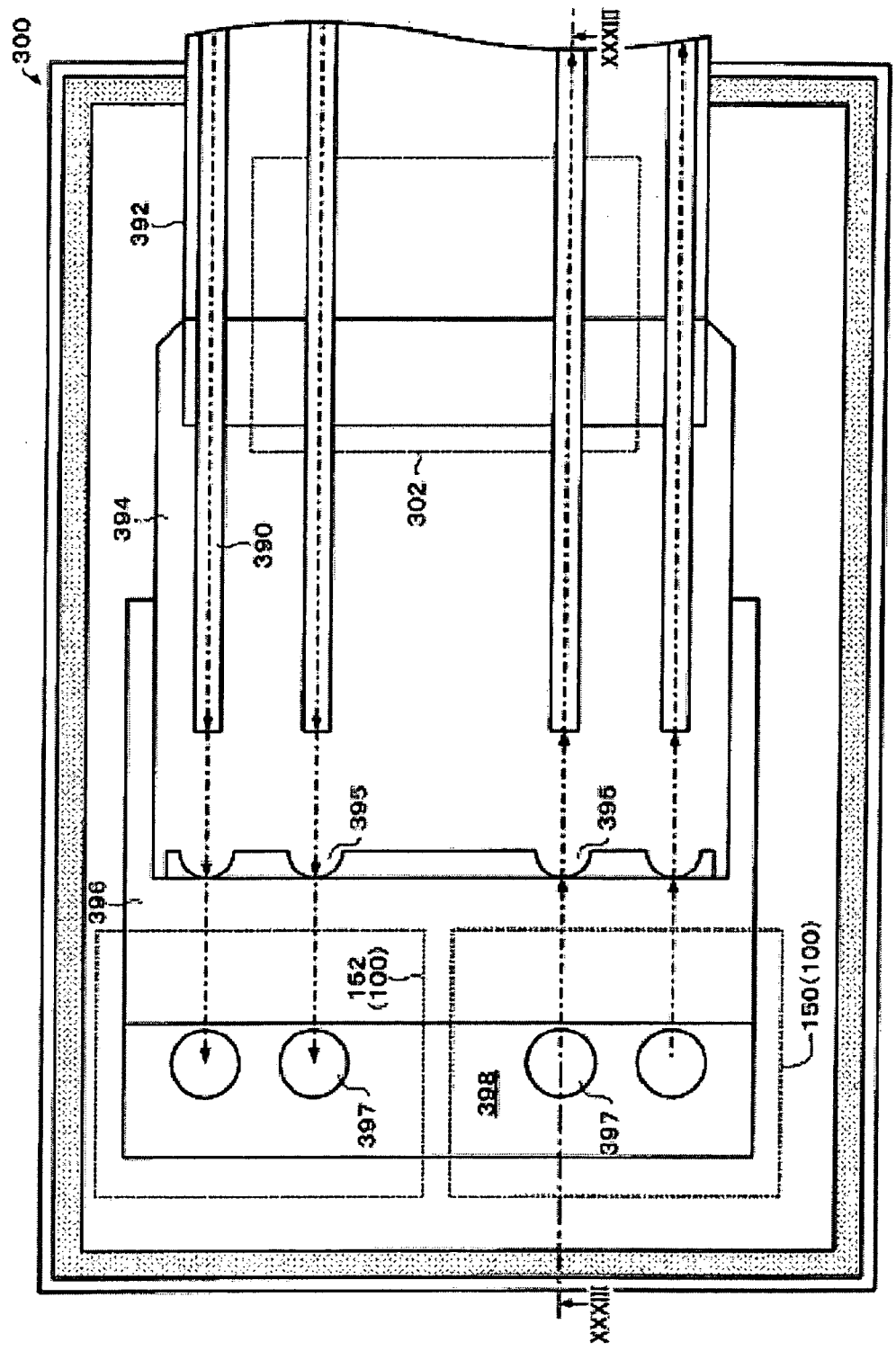
FIG. 32 is a plan view schematically showing the optical module in accordance with the third embodiment of the invention.
Figure 33:
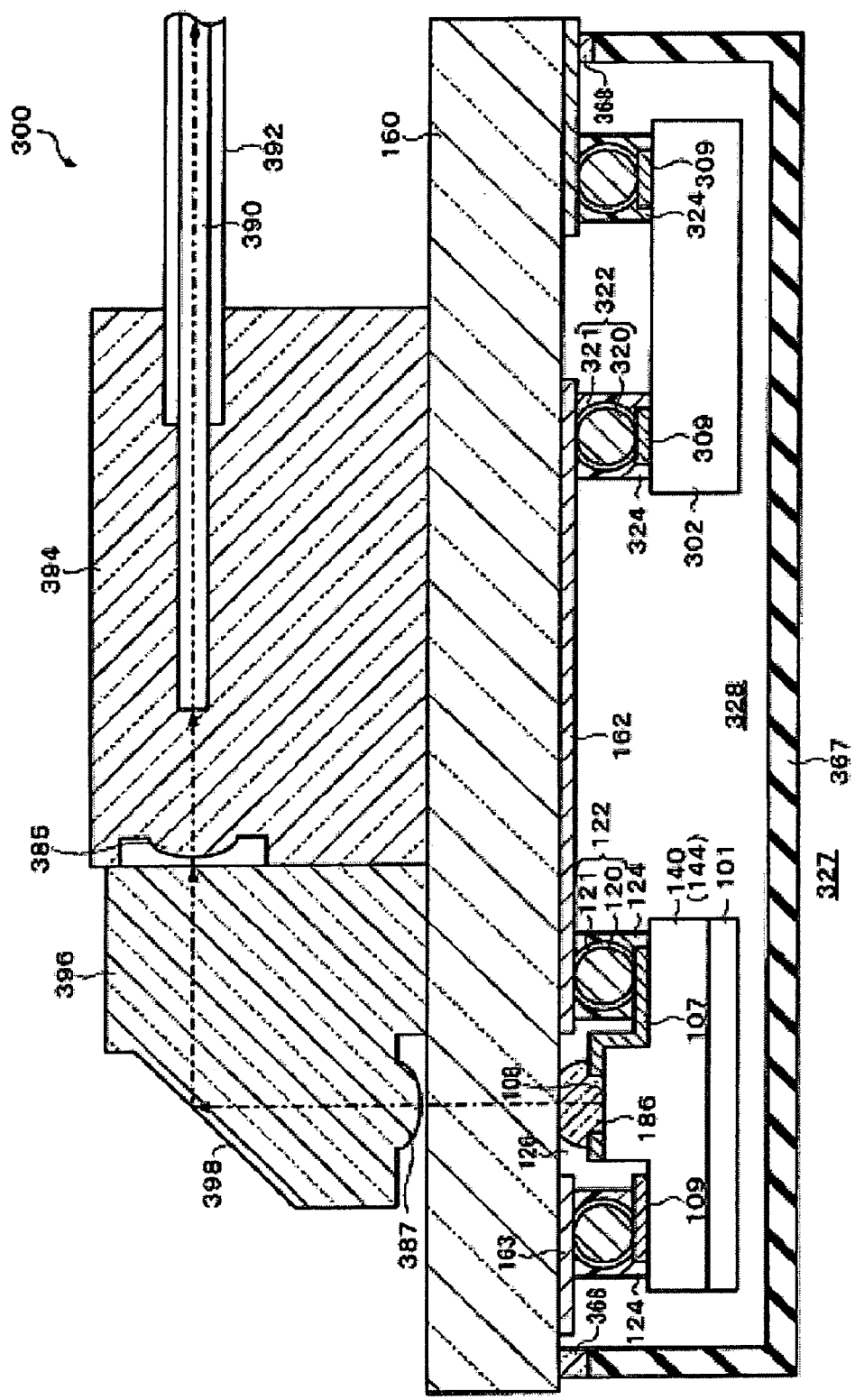
FIG. 33 is a cross-sectional view schematically showing the optical module in accordance with the third embodiment of the invention.

Also, the optical module 300 in accordance with the present embodiment may further include, an optical waveguide 390, an optical plug 394, an optical socket 396, and a reflection section 398, for example, as shown in FIG. 32 and FIG. 33. According to this optical module 300, optical signals can be transmitted and received through the optical waveguide 390 to conduct optical data communications. FIG. 32 is a plan view schematically showing the optical module 300. FIG. 33 is a cross-sectional view schematically showing the optical module 300. It is noted that FIG. 33 is a cross-sectional view taken along a line XXXIII—XXXIII of FIG. 32. Also, illustration of some of the members is omitted for convenience' sake. Further, the figures schematically indicate courses of light by arrows.

The optical waveguides 390 are formed above the second substrate 160. For example, as shown in the figure, optical fibers in a tape fiber 392 may be used as the optical waveguides 390. The optical waveguides (optical fibers) 390 are disposed such that the waveguide direction of light becomes to be in parallel with the upper surface of the second substrate 160.

The optical plug 394 is formed on the second substrate 160 at one end of the optical waveguide 390. The optical plug 394 supports the tape fiber 392. The optical socket 396 is formed on the second substrate 160. The optical plug 394 is attached to the optical socket 396. The optical plug 394 can be freely attached to and detached from the optical socket 396.

The reflection section 398 is formed above the second substrate 160. The reflection section 398 has at least one of a function to change the course of light outputted from the optical section 144 by 90 degrees (or about 90 degrees) to be guided to the optical waveguide 390, and a function to change the course of light outputted from the optical waveguide 390 by 90 degrees (or about 90 degrees) to be guided to the optical section 144. The reflection section 398 can be formed, for example, from a portion of the side surface of the optical socket 396 as shown in the figure. In the illustrated example, the reflection section 398 is provided in a manner to be angled at 45 degrees with respect to the optical surface 108.

The optical plug 394 and optical socket 396 may have lens sections 385 and 387, respectively, as shown in the figure. Each of the lens sections 385 and 387 can focus at least one of light outputted from the optical section 144 and light outputted from the optical waveguide 390.

Figure 34:
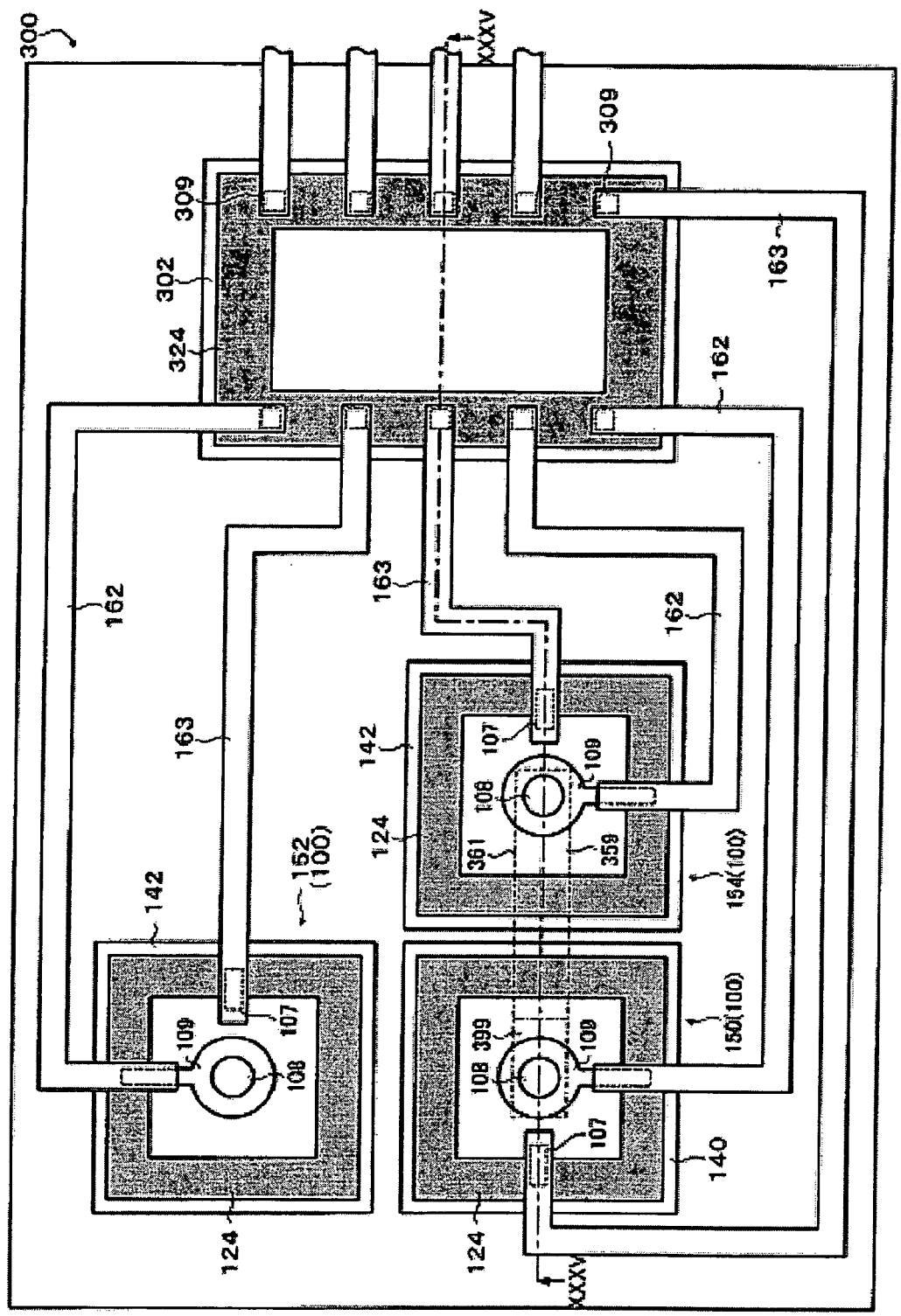
FIG. 34 is a plan view schematically showing a modified example of the optical module in accordance with the third embodiment of the invention.
Figure 35:
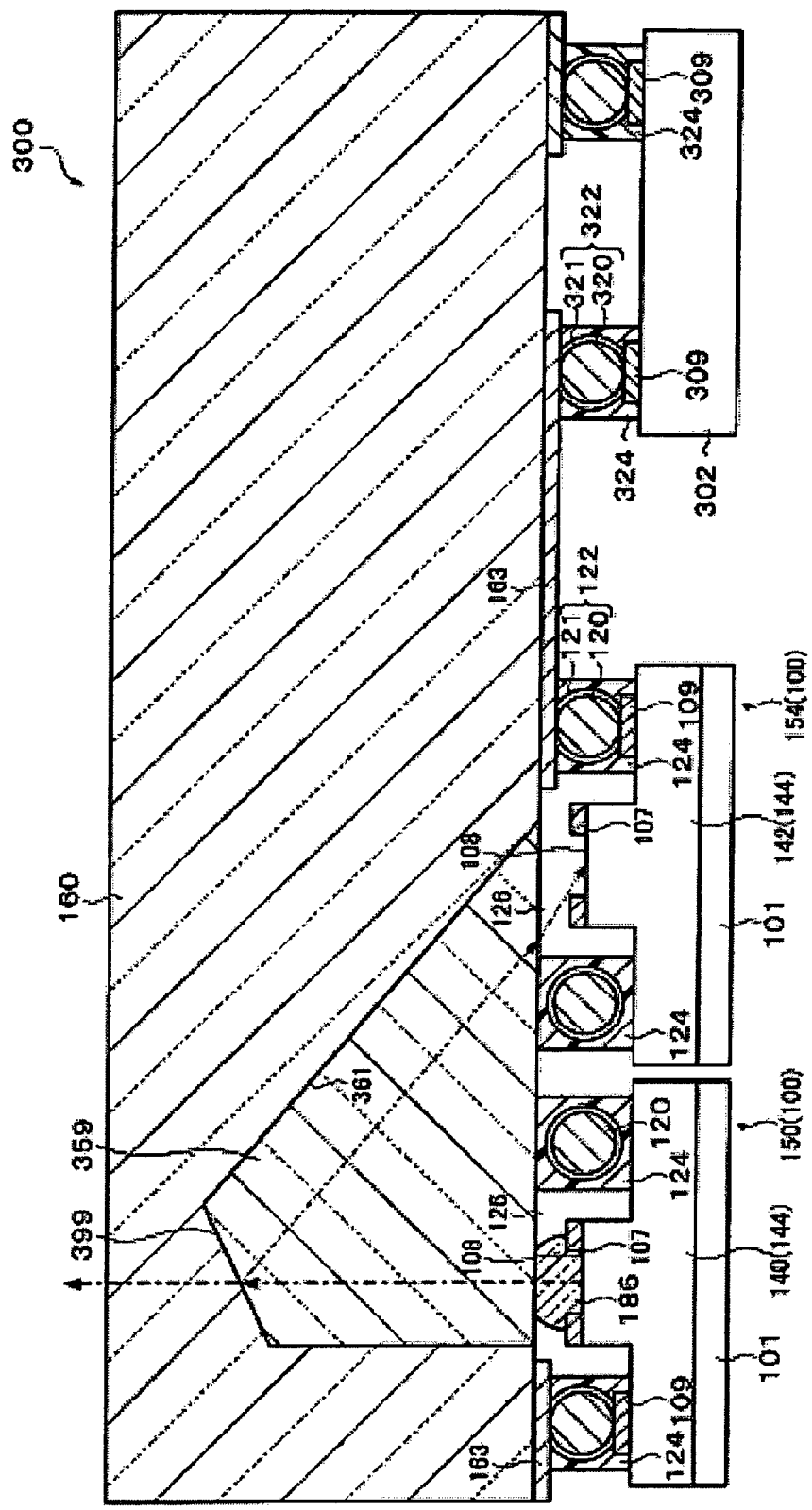
FIG. 35 is a cross-sectional view schematically showing a modified example of the optical module in accordance with the third embodiment of the invention.

3.2. Next, a modified example of the optical module 300 in accordance with the present embodiment is described with reference to the accompanying drawings. It is noted that features different from those of the optical module 300 shown in FIG. 29 and FIG. 30 described above shall be described, and descriptions of similar features shall be omitted. FIG. 34 is a plan view schematically showing the optical module 300. FIG. 35 is a cross-sectional view schematically showing the optical module 300. It is noted that FIG. 35 is a cross-sectional view taken along a line XXXV—XXXV of FIG. 34. Also, illustration of some of the members is omitted for convenience' sake. Further, the figures schematically indicate courses of light by arrows.

The optical module 300 includes an optical element 150 having an emission section, an optical element 152 having a photodetection section, another optical element 154 having a photodetection section, and an electronic circuit 302. The optical element 150 having an emission section and the optical element 152 having a photodetection section may be applicable, for example, to an optical transceiver for connecting a computer, industrial robots and electronic devices to one another, and components within these devices to one another by optical fibers. In other words, the optical transceiver may include an optical element 150 that converts an electrical signal to an optical signal and transmits the signal to an optical fiber (optical waveguide) and an optical element 152 that converts an optical signal received from the optical fiber back to an electrical signal, and another pair of an optical element 150 and an optical element 152 provided through the optical fiber. It is noted that, in the optical elements 150, 152 and 154, members that are substantially the same as those of the optical element in accordance with the first embodiment shall be appended with the same reference numbers and their detailed description shall be omitted.

The optical module 300 includes a partial reflection section 399 that is formed above an emission section 140, and conducts a part of light emitted from the emission section 140 to a photodetection section 142 of the other optical element 154. In other words, the partial reflection section 399 can reflect a part of light emitted from the emission section 140, and transmit the remaining light. The tilt angle of the partial reflection section 399 with respect to a plane of emission 108 of the optical element 150 is appropriately set such that a part of light emitted from the emission section 140 is conducted to a plane of incidence 108 of the other optical element 154.

A groove section 361 is formed on a lower surface side of the second substrate 160, as shown in FIG. 34 and FIG. 35. A resin layer 359 is embedded in the groove section 361. The resin layer 359 has an index of refraction different from an index of refraction of the second substrate 160. By this, an interface between the resin layer 359 and the second substrate 160 defines the partial reflection section 399. The index of refraction of the resin layer 359 and the index of refraction of the second substrate 160 are appropriately set such that a part of light emitted from the emission section 140 can be conducted to the plane of incidence 108 of the other optical element 154. For example, an underfill material may be used as the resin layer 359. The underfill material is composed of, for example, thermosetting type or ultraviolet ray setting type epoxy resin or acrylic resin. When such an underfill material is used, it is possible to make the index of refraction of the resin layer 359 to be a desired value that is different from the index of refraction of the second substrate 160 when the resin layer 359 is hardened by heat or irradiation of ultraviolet ray.

Figure 36:
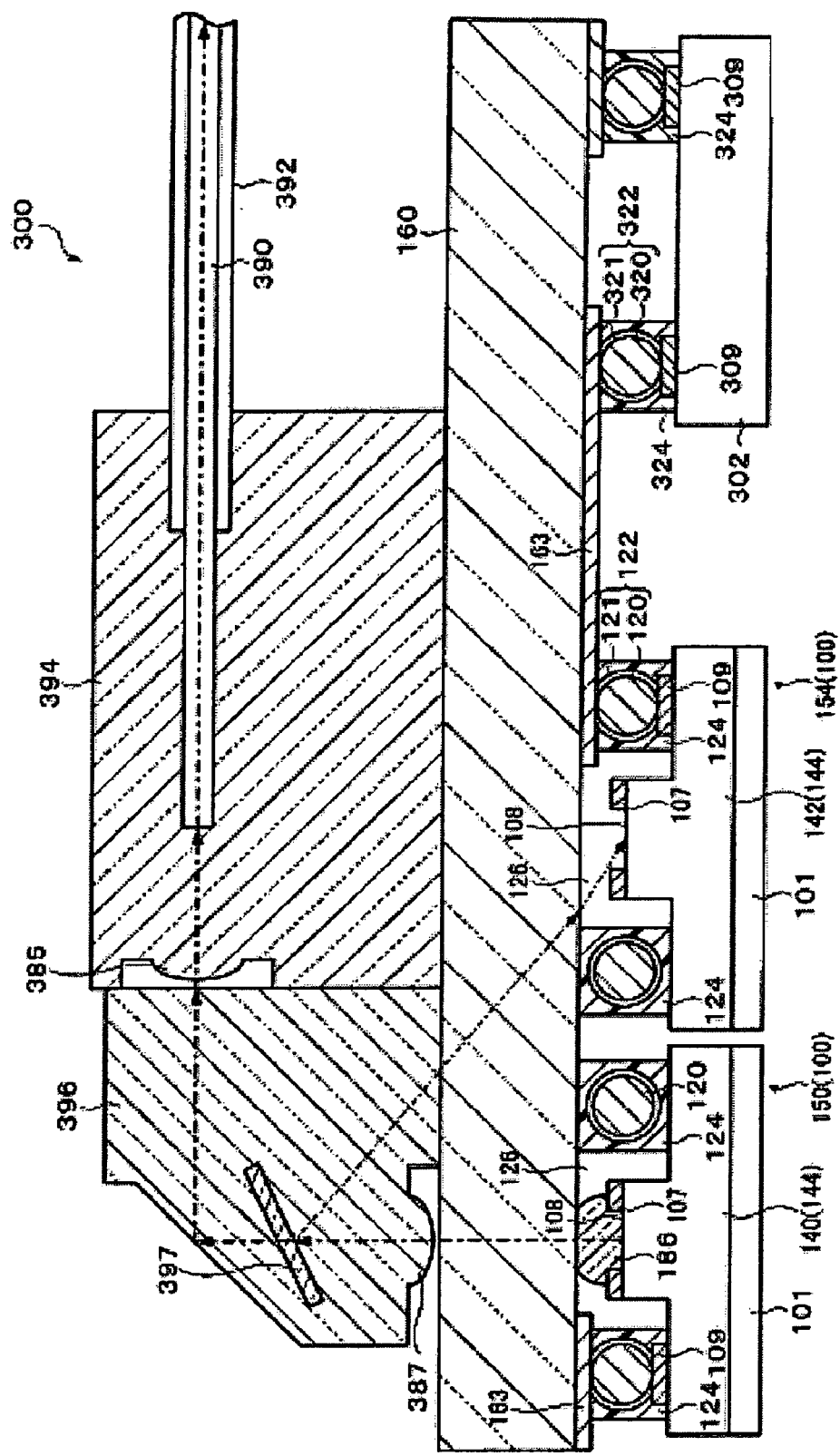
FIG. 36 is a cross-sectional view schematically showing a modified example of the optical module in accordance with the third embodiment of the invention.

In the above-described modified example, descriptions are made as to the case where the groove section 361 is formed in the second substrate 160, and the partial reflection section 399 is formed by embedding the resin layer 359 in the groove section 361. However, for example, as shown in FIG. 36, like the example shown in FIG. 32 and FIG. 33, an optical waveguide 390, an optical plug 394, an optical socket 396 and the like may be formed above the second substrate 160, and a partial reflection section 397 may be embedded in the optical socket 396. As the partial reflection section 397, for example, a glass substrate that reflects a part of light and transmits the remaining light may be used. FIG. 36 is a cross-sectional view schematically showing the optical module 300 in this case. It is noted that illustration of some of the members is omitted for convenience' sake.

Further, like the example shown in FIG. 29 and FIG. 30 described above, the optical module 300 can have a housing that stores at least the optical element 150 having an emission section, the optical element 152 having a photodetection section, the other optical element 154 having a photodetection section, and the electronic circuit 170. Also, the optical module 300 can have a housing that stores at least the optical element 150 having an emission section, the optical element 152 having a photodetection section, and the other optical element 154 having a photodetection section. When the optical module 300 is provided with a housing like the modified examples described above, the optical elements 150, 152 and 154 and the corresponding wirings may be connected by a flip-chip bonding method, an anisotropic conductive film method, or a solder reflow method, instead of the method of conductively connecting them with the conductive members 122 contained in the sealing members 124.

It is noted that the modified examples described above are merely examples, and the invention is not limited to these modified examples.

Also, the optical module 300 in accordance with the present embodiment is applicable, for example, to at least a part of a display device such as a liquid crystal display panel and a plasma display panel. In this case, the second substrate 160 in accordance with the present embodiment may be used as a display substrate of the display device.

4. Although the embodiments of the invention are described above in detail, it should be readily understood by a person having ordinary skill in the art that many modifications can be made without departing in substance from the novelty and effects of the invention. Accordingly, such modified examples should be included in the scope of the invention.

For example, in the optical elements 100 in accordance with the embodiments described above, the description is made as to the case where a single first columnar section 130 is provided in the emission section 140. However, the mode of the invention shall not be harmed even when a plurality of first columnar sections 130 are provided in the emission section 140, or when the first columnar section 130 is not formed. Also, when a plurality of optical elements 100 are formed in an array, similar actions and effects shall be exhibited. Furthermore, it should be noted that, for example, interchanging the p-type and n-type characteristics of each of the semiconductor layers in the above described embodiments does not deviate from the subject matter of the invention.

What is claimed is:

1. An optical element comprising:
    an optical section having at least one of an emission section and a photodetection section;
    a sealing member that surrounds at least a part of the optical section through an internal space;
    an electrode that is electrically connected to the optical section;
    a conductive member that is contained in the sealing member and conductively connected to the electrode;
    a substrate that is disposed opposite to an optical surface provided at the optical section; and
    a wiring that is formed on the substrate and conductively connected to the conductive member,
    wherein the optical surface is at least one of a plane of light emission and a plane of light incidence.

2. An optical element according to claim 1, comprising a plurality of the electrodes, a plurality of the conductive members, and a plurality of the wirings, wherein each of the plurality of the conductive members is conductively connected to each corresponding one of the plurality of the electrodes, and each of the plurality of the wirings is conductively connected to each corresponding one of the conductive members.

3. An optical element according to claim 1, wherein the conductive member is a spacer between the electrode and the wiring.

4. An optical element according to claim 1, wherein the conductive member includes a conductive grain and a coating layer that coats the conductive grain.

5. An optical element according to claim 1, wherein the optical section has the emission section, and the emission section includes a first mirror, an active layer formed above the first mirror, and a second mirror formed above the active layer.

6. An optical element according to claim 5, wherein the emission section has an oxidized constricting layer, and the sealing member surrounds at least the oxidized constricting layer.

7. An optical element according to claim 1, wherein the optical section has the photodetection section, and the photodetection section includes a first semiconductor layer of a first conductivity type, a photoabsorption layer formed above the first semiconductor layer, and a second semiconductor layer of a second conductivity type formed above the photoabsorption layer.

8. An optical element according to claim 1, wherein the optical section has the emission section and the photodetection section, the emission section includes a first mirror, an active layer formed above the first mirror, and a second mirror formed above the active layer, and the photodetection section includes a first semiconductor layer of a first conductivity type, a photoabsorption layer formed above the first semiconductor layer, and a second semiconductor layer of a second conductivity type formed above the photoabsorption layer.

9. An optical element according to claim 1, comprising a resin layer formed above the optical surface, and in contact with the optical surface and the substrate, wherein the resin layer has an index of refraction that is the same as an index of refraction of the substrate.

10. An optical element according to claim 1, comprising a housing that stores at least the optical section, and another sealing member formed between the housing and the substrate.

11. An optical module comprising:
an optical section having at least one of an emission section and a photodetection section;
a sealing member that surrounds at least a part of the optical section through an internal space;
an electrode that is electrically connected to the optical section;
a conductive member that is contained in the sealing member and conductively connected to the electrode;
a substrate that is disposed opposite to an optical surface provided at the optical section;
a wiring that is formed on the substrate and conductively connected to the conductive member; and
an electronic circuit that is electrically connected to the wiring,
wherein the optical surface is at least one of a plane of light emission and a plane of light incidence.

12. An optical module according to claim 11, comprising a plurality of the optical sections, wherein the plurality of the optical sections are surrounded by a single piece of the sealing member through the internal space.

13. An optical module according to claim 11, comprising a housing that stores at least the optical section and the electronic circuit, and another sealing member formed between the housing and the substrate.

14. An optical module according to claim 11, comprising
an optical waveguide formed above the substrate,
an optical plug that is formed above the substrate at one of end sections of the optical waveguide,
an optical socket that is formed above the substrate with the optical plug attached thereto, and
a reflection section that is formed above the substrate and has at least one of a function of changing a course of light emitted from the optical section by 90 degrees and conducting the light to the optical waveguide and a function of changing a course of light emitted from the optical waveguide by 90 degrees and conducting the light to the optical section.

15. An optical module, comprising
an optical section having at least one of an emission section and a photodetection section;
a sealing member that surrounds at least a part of the optical section through an internal space;
a plurality of electrode that is electrically connected to the optical section;
a plurality of of the conductive members, each of the plurality of the conductive members is conductively connected to each corresponding one of the plurality of the electrodes;
a substrate that is disposed opposite to an optical surface provided at the optical section, the optical surface is at least one of a plane of light emission and a plane of light incidence;
a plurality of the wirings, and each of the plurality of the wirings is conductively connected to each corresponding one of the conductive members;
the emission section;
a first sealing member that surrounds at least a part of the emission section through an internal space;
a first electrode electrically connected to the emission section;
a first conductive member that is contained in the first sealing member and conductively connected to the electrode,
the photodetection section;
a second sealing member that surrounds at least a part of the photodetection section through an internal space;
a second electrode that is electrically connected to the photodetection section;
a second conductive member that is contained in the other sealing member and conductively connected to the other electrode;
a first wiring that is formed at the substrate and conductively connected to the first conductive member;
a second wiring that is formed at the substrate and conductively connected to the second conductive member;
a partial reflection section that is formed above the emission section and conducts a part of light emitted from the emission section to the photodetection section; and
an electronic circuit that is electrically connected to the first wiring and the second wiring,
wherein the substrate is disposed opposite to a plane of emission provided at the emission section and a plane of incidence provided at the photodetection section.

16. An optical module according to claim 15, comprising an optical waveguide formed above the substrate, an optical plug that is formed above the substrate at one of end sections of the optical waveguide, an optical socket that is formed above the substrate with the optical plug attached thereto, and a reflection section that is formed above the substrate and has at least one of a function of changing a course of light outputted from the optical section by 90 degrees and conducting the light to the optical waveguide and a function of changing a course of light outputted from the optical waveguide by 90 degrees and conducting the light to the optical section, wherein the partial reflection section is embedded in the optical socket.

17. An optical transceiver comprising
the optical module to according to claim 11.

18. An optical element according to claim 10, comprising a heat radiation member formed between the housing and the optical section.

19. An optical module according to claim 15, comprising
a groove section formed on a lower surface side of the substrate, and a resin layer embedded in the groove section, wherein the resin layer has an index of refraction different from an index of refraction of the substrate, and the partial reflection section is defined by an interface between the resin layer and the substrate.

20. An optical module comprising
the optical element according to claim 1, a mounting member on which the optical element is mounted, a lead terminal provided on the mounting member, and a conductive connection member that conductively connects the wiring and the lead terminal.

* * * * *